United States Patent
Pratas et al.

(10) Patent No.: US 12,032,653 B2
(45) Date of Patent: Jul. 9, 2024

(54) METHOD AND APPARATUS FOR DISTRIBUTED AND COOPERATIVE COMPUTATION IN ARTIFICIAL NEURAL NETWORKS

(71) Applicant: Intel Corporation, Santa Clara, CA (US)

(72) Inventors: Frederico C. Pratas, Mirandela (ES); Ayose J. Falcon, Barcelona (ES); Marc Lupon, Barcelona (ES); Fernando Latorre, Cambridge (GB); Pedro Lopez, Barcelona (ES); Enric Herrero Abellanas, Barcelona (ES); Georgios Tournavitis, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 17/306,877

(22) Filed: May 3, 2021

(65) Prior Publication Data
US 2021/0326405 A1     Oct. 21, 2021

Related U.S. Application Data

(63) Continuation of application No. 15/521,856, filed as application No. PCT/US2015/061453 on Nov. 19, 2015, now Pat. No. 10,997,273.

(30) Foreign Application Priority Data

Dec. 19, 2014    (EP) ...................................... 14382553

(51) Int. Cl.
*G06F 17/15*        (2006.01)
*G06F 12/0875*     (2016.01)
(Continued)

(52) U.S. Cl.
CPC ........ *G06F 17/153* (2013.01); *G06F 12/0875* (2013.01); *G06N 3/04* (2013.01); *G06N 3/063* (2013.01); *G06F 2212/1024* (2013.01)

(58) Field of Classification Search
CPC .............................. G06N 3/063; G06F 17/153
See application file for complete search history.

(56) References Cited

U.S. PATENT DOCUMENTS

| | | |
|---|---|---|
| 5,465,375 A | 11/1995 | Thepaut et al. |
| 5,600,843 A | 2/1997 | Kato et al. |

(Continued)

FOREIGN PATENT DOCUMENTS

| | | |
|---|---|---|
| CN | 1251136 C | 4/2006 |
| CN | 103455843 A | 12/2013 |

(Continued)

OTHER PUBLICATIONS

Jin, Jonghoon, et al. "An efficient implementation of deep convolutional neural networks on a mobile coprocessor." 2014 IEEE 57th International Midwest Symposium on Circuits and Systems (MWSCAS). IEEE, Aug. 2014. (Year: 2014).*

(Continued)

*Primary Examiner* — Benjamin P Geib
(74) *Attorney, Agent, or Firm* — Nicholson De Vos Webster & Elliott LLP

(57) ABSTRACT

An apparatus and method are described for distributed and cooperative computation in artificial neural networks. For example, one embodiment of an apparatus comprises: an input/output (I/O) interface; a plurality of processing units communicatively coupled to the I/O interface to receive data for input neurons and synaptic weights associated with each of the input neurons, each of the plurality of processing units to process at least a portion of the data for the input neurons and synaptic weights to generate partial results; and an (Continued)

interconnect communicatively coupling the plurality of processing units, each of the processing units to share the partial results with one or more other processing units over the interconnect, the other processing units using the partial results to generate additional partial results or final results. The processing units may share data including input neurons and weights over the shared input bus.

18 Claims, 45 Drawing Sheets

(51) Int. Cl.
*G06N 3/04* (2023.01)
*G06N 3/063* (2023.01)

(56) References Cited

U.S. PATENT DOCUMENTS

| | | | |
|---|---|---|---|
| 5,682,491 | A | 10/1997 | Pechanek et al. |
| 10,078,620 | B2 | 9/2018 | Farabet et al. |
| 2009/0192958 | A1 | 7/2009 | Todorokihara |
| 2012/0323832 | A1 | 12/2012 | Snook et al. |
| 2014/0142929 | A1* | 5/2014 | Seide .............. G06N 3/08 704/202 |
| 2014/0351190 | A1 | 11/2014 | Levin et al. |
| 2015/0112911 | A1 | 4/2015 | Jackson et al. |
| 2015/0170021 | A1 | 6/2015 | Lupon et al. |
| 2015/0261702 | A1 | 9/2015 | Culurciello et al. |

FOREIGN PATENT DOCUMENTS

| | | |
|---|---|---|
| CN | 103853872 A | 6/2014 |
| CN | 103890787 A | 6/2014 |
| EP | 0525543 A2 | 2/1993 |
| KR | 10-2004-0040075 A | 5/2004 |
| TW | 201338541 A | 9/2013 |
| WO | 91/18347 A1 | 11/1991 |
| WO | 2014/025765 A2 | 2/2014 |

OTHER PUBLICATIONS

Gokhale, Vinayak, et al. "A 240 g-ops/s mobile coprocessor for deep neural networks." Proceedings of the IEEE conference on computer vision and pattern recognition workshops. Jun. 2014. (Year: 2014).*

Farabet, Clément, et al. "Neuflow: A runtime reconfigurable dataflow processor for vision." CVPR 2011 workshops. IEEE, 2011. (Year: 2011).*

Office Action, KR App. No. 10-2017-7013506, dated Aug. 30, 2022, 20 pages (11 pages of English Translation and 9 pages of Original Document).

Rojas, Raul, "Hardware for Neural Networks", Neural Network and A Systematic Introduction, Springer-Verlag, 1996, pp. 451-478.

Texas Instruments, "OMAP(trademark) 5 mobile application platform", Product Bulletin, 2011, 5 pages.

Al Maashri A et al., "A Hardware Architecture for Accelerating Neuromorphic Vision Algorithms", Signal Processing Systems (SIPS), 2011, IEEE Workshop on, IEEE, Oct. 4, 2011, pp. 355-360.

Chen, Tianshi, et al. "Diannao: A small-footprint high-throughput accelerator for ubiquitous machine-learning." ACM SIGARCH Computer Architecture News 42.1 (2014): 269-284. (Year: 2014).

Clement Farabet et al., "Hardware accelerated convolutional neural networks for synthetic vision systems", IEEE International Symposium on Circuits and Systems. ISCAS 2010, May 30, 2010, pp. 257-260.

Communication pursuant to Article 71(3) EPC for Application No. 14382553.7, dated Jun. 18, 2019, 7 pages.

Communication pursuant to Article 94(3) EPC for Application No. 14382553.7, dated May 31, 2018, 6 pages.

Conti Francesco et al., "Energy-Efficient Vision on the PULP Platform for Ultra-Low Power Parallel Computing", 2014 IEEE Workshop on Signal Processing Systems (SIPS), IEEE, Oct. 20, 2014, pp. 1-6.

Decision of Rejection for foreign counterpart Taiwan Application No. 104137730, dated Apr. 28, 2017, 6 pages.

Decision to grant a European patent pursuant to Article 97(1) EPC, EP App. No. 14382553.7, dated Oct. 31, 2019, 2 pages.

Extended European Search Report for foreign counterpart European Application No. 14382553.7, dated Jun. 19, 2015, 7 pages.

Farabet, et al., "NeuFlow: A Runtime Reconfigurable Dataflow Processor for Vision", IEEE Workshop of Embedded Computer Vision, Jun. 2011, pp. 109-116.

Gokhale, Vinayak, et al. "A 240 g-ops/s mobile coprocessor for deep neural networks." Proceedings of the IEEE Conference on Computer Vision and Pattern Recognition Workshops. 2014. (Year: 2014).

International Preliminary Report on Patentability for Application No. PCT/US2015/061453, dated Jun. 29, 2017, 9 pages.

International Search Report and Written Opinion for Application No. PCT/US2015/061453, dated Feb. 26, 2016, 12 pages.

Jagdish Sabarad et al., "A Reconfigurable Accelerator for Neuromorphic Object Recognition", Design Automation Conference (ASP-DAG), 2012 17th Asia and South Pacific, IEEE, Jan. 30, 2012, pp. 813-818.

Non-Final Office Action, U.S. Appl. No. 15/521,856, dated Jun. 25, 2020, 17 pages.

Notice of Allowance from foreign counterpart Taiwan Patent Application No. 104137730, dated Jan. 29, 2018, 4 pages. (Translation available only for Search report).

Notice of Allowance, U.S. Appl. No. 15/521,856, dated Jan. 13, 2021, 8 pages.

Notification to Grant Patent Right for Invention, CN App. No. 201580067143.7, dated Apr. 15, 2021, 8 pages (4 pages of English Translation and 4 pages of Original Document).

Office Action and Search Report for foreign counterpart Taiwan Application No. 104137730, dated Jan. 23, 2017, 10 pages.

Office Action, CN App. No. 201580067143.7, dated Mar. 4, 2020, 15 pages (8 pages of English Translation and 7 pages of Original Document).

Putnam, Andrew, et al. "A reconfigurable fabric for accelerating large-scale datacenter services." 2014 ACM/IEEE 41st International Symposium on Computer Architecture (ISCA). IEEE, 2014. (Year: 2014).

Savich, Antony, and Shawki Areibi. "A low-power scalable stream compute accelerator for general matrix multiply (GEMM)." VLSI Design 2014 (2014). (Year: 2014).

Second Office Action, CN App. No. 201580067143.7, dated Oct. 10, 2020, 18 pages (11 pages of English Translation and 7 pages of Original Document).

Srimat Chakradhar et al. "A Dynamically Configurable Coprocessor for Convolutional Neural Networks", Proceedings of the 37th Annual International Symposium on Computer Architecture, ISCA '10, Jun. 19, 2010, pp. 247-257.

Supplemental Notice of Allowability, U.S. Appl. No. 15/521,856, dated Feb. 4, 2021, 3 pages.

Third Office Action, CN App. No. 201580067143.7, dated Jan. 5, 2021, 20 pages (13 pages of English Translation and 7 pages of Original Document).

Kung, "Why systolic architectures?," in Computer, vol. 15, No. 1, Jan. 1982, pp. 37-46.

Lopez, "Programmable VLSI systolic processors for neural network and matrix computations", PhD thesis, the Ecole Polytechnique Federale de Lausanne, and the Switzerland, 1996, 160 pages.

Request for the Submission of an Opinion, KR App. No. 10-2022-7037483, dated Mar. 22, 2023, 21 pages (11 pages of English Translation and 10 pages of Original Document).

Written Decision on Registration, KR App. No. 10-2017-7013506, dated Mar. 9, 2023, 6 pages (3 pages of English Translation and 3 pages of Original Document).

Non-Final Office Action, U.S. Appl. No. 17/949,093, dated Jan. 5, 2024, 20 pages.

(56) References Cited

OTHER PUBLICATIONS

Office Action, KR App. No. 10-2022-7037483, dated Sep. 22, 2023, 5 pages (1 pages of English Translation and 4 pages of Original Document).
Notice of Allowance, KR App. No. 10-2022-7037483, Feb. 23, 2024, 05 pages of Original Document Only.

* cited by examiner

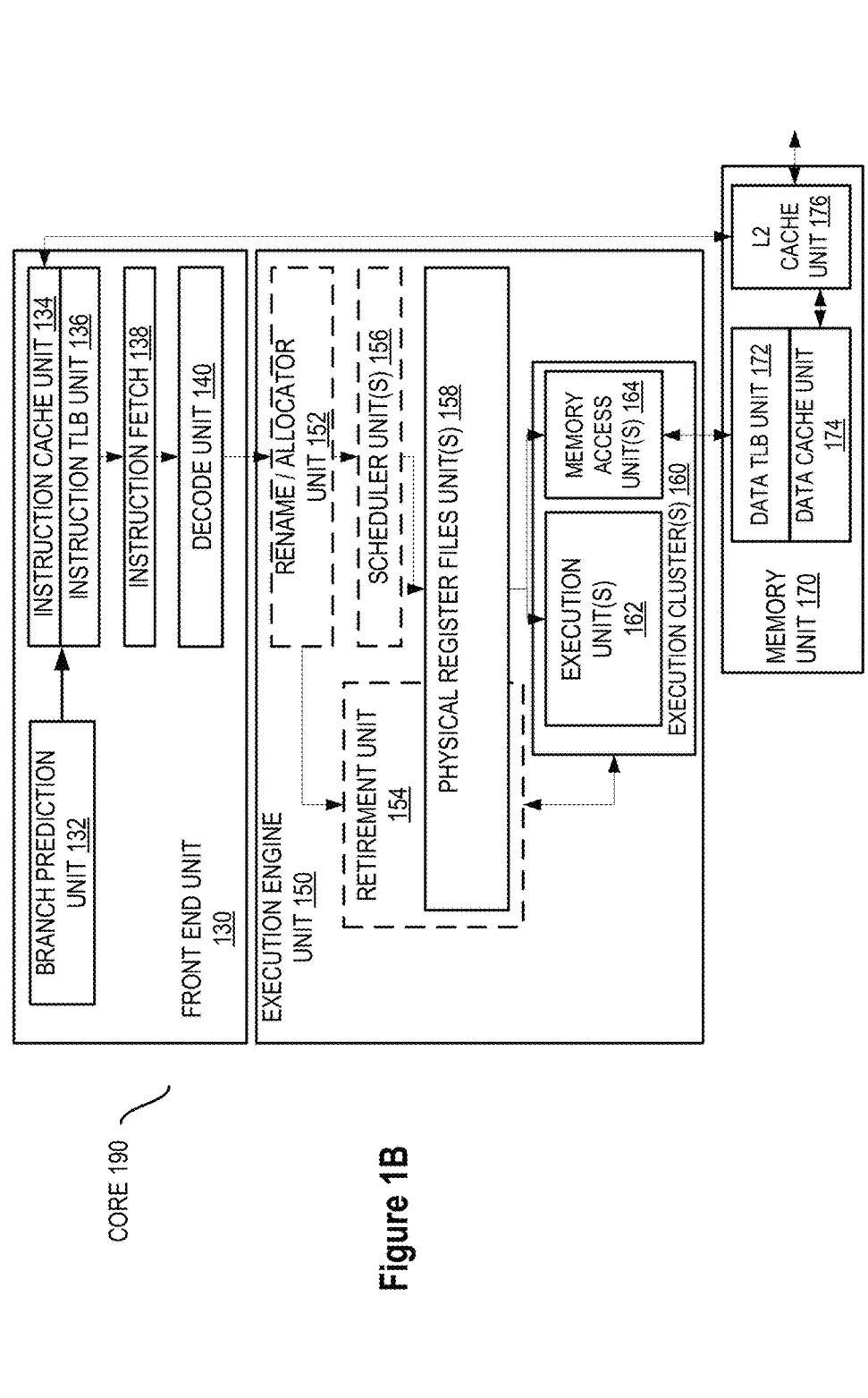
Figure 1A
Figure 1B

Fig. 23

| Alignment | $AO_0$ | $AO_1$ | $AO_2$ | $AO_3$ |
|---|---|---|---|---|
| 4 elements 1B/1 element 4B | $O_0$ | $O_1$ | $O_2$ | $O_3$ |
| 1 element 2B (position 0) | $O_0$ | $O_1$ | - | - |
| 1 element 2B (position 1) | $O_2$ | $O_3$ | - | - |
| 1 element 1B (position 0) | $O_0$ | - | - | - |
| 1 element 1B (position 1) | $O_1$ | - | - | - |
| 1 element 1B (position 2) | $O_2$ | - | - | - |
| 1 element 1B (position 3) | $O_3$ | - | - | - |

Fig. 30

| Output mode | Output_Pos$_0$ | Output_Pos$_1$ | Output_Pos$_2$ | Output_Pos$_3$ |
|---|---|---|---|---|
| 4B Row mode | C$_x$_AO$_0$ | C$_x$_AO$_1$ | C$_x$_AO$_2$ | C$_x$_AO$_3$ |
| 4B Column mode | C$_w$_AO$_0$ | C$_x$_AO$_0$ | C$_y$_AO$_0$ | C$_z$_AO$_0$ |
| 4B Square mode(2x2) | C$_x$_AO$_0$ | C$_x$_AO$_1$ | C$_y$_AO$_0$ | C$_y$_AO$_1$ |

*Fig. 31*

METHOD AND APPARATUS FOR DISTRIBUTED AND COOPERATIVE COMPUTATION IN ARTIFICIAL NEURAL NETWORKS

CROSS-REFERENCE TO RELATED APPLICATIONS

This application is a continuation of application Ser. No. 15/521,856, filed Apr. 25, 2017, which is the National stage of International Application No. PCT/US2015/061453, filed Nov. 19, 2015, which claims priority to European Application No. 14382553.7, filed Dec. 19, 2014, which are hereby incorporated by reference.

TECHNICAL FIELD

This invention relates generally to the field of computer processors. More particularly, the invention relates to a method and apparatus for neural network acceleration.

BACKGROUND ART

ANNs are generally presented as systems of interconnected "neurons" which can compute values from inputs. ANNs represent one of the most relevant and widespread techniques used to learn and recognize patterns. Consequently, ANNs have emerged as an effective solution for intuitive human/device interactions that improve user experience, a new computation paradigm known as "cognitive computing." Among other usages, ANNs can be used for imaging processing, voice and object recognition or natural language processing. Convolution Neural Networks (CNNs) or Deep Belief Networks (DBNs) are just a few examples of computation paradigms that employ ANN algorithms.

BRIEF DESCRIPTION OF THE DRAWINGS

A better understanding of the present invention can be obtained from the following detailed description in conjunction with the following drawings, in which:

FIG. 1A is a block diagram illustrating both an exemplary in-order fetch, decode, retire pipeline and an exemplary register renaming, out-of-order issue/execution pipeline according to embodiments of the invention;

FIG. 1B is a block diagram illustrating both an exemplary embodiment of an in-order fetch, decode, retire core and an exemplary register renaming, out-of-order issue/execution architecture core to be included in a processor according to embodiments of the invention;

FIG. 23 shows an example set of input data used in a convolver;

FIG. 30 illustrates a table showing alignment modes implemented in one embodiment of the invention;

FIG. 31 illustrates a table showing logic employed in one embodiment of the invention;

DETAILED DESCRIPTION

Figure 2:
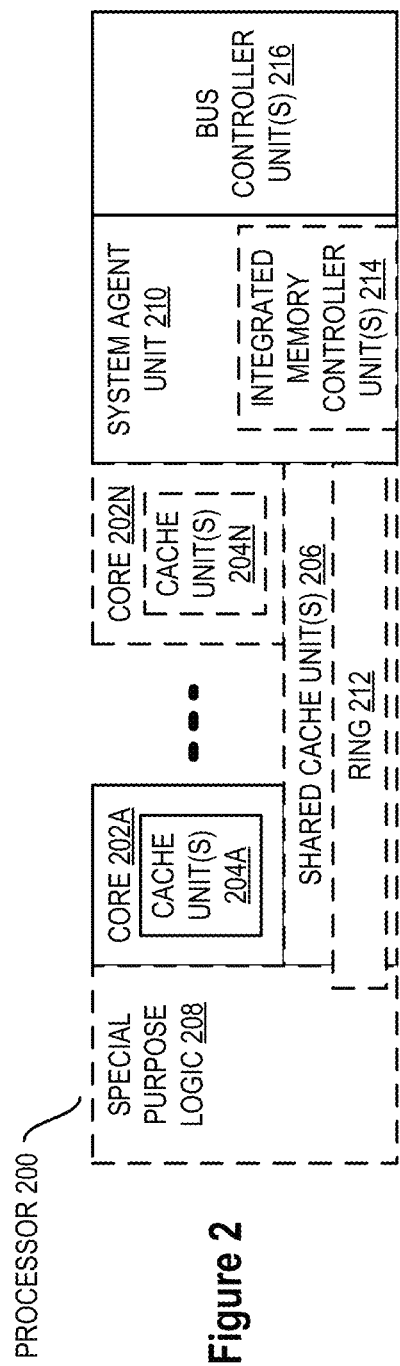
FIG. 2 is a block diagram of a single core processor and a multicore processor with integrated memory controller and graphics according to embodiments of the invention.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202A-N.

In some embodiments, one or more of the cores 202A-N are capable of multithreading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
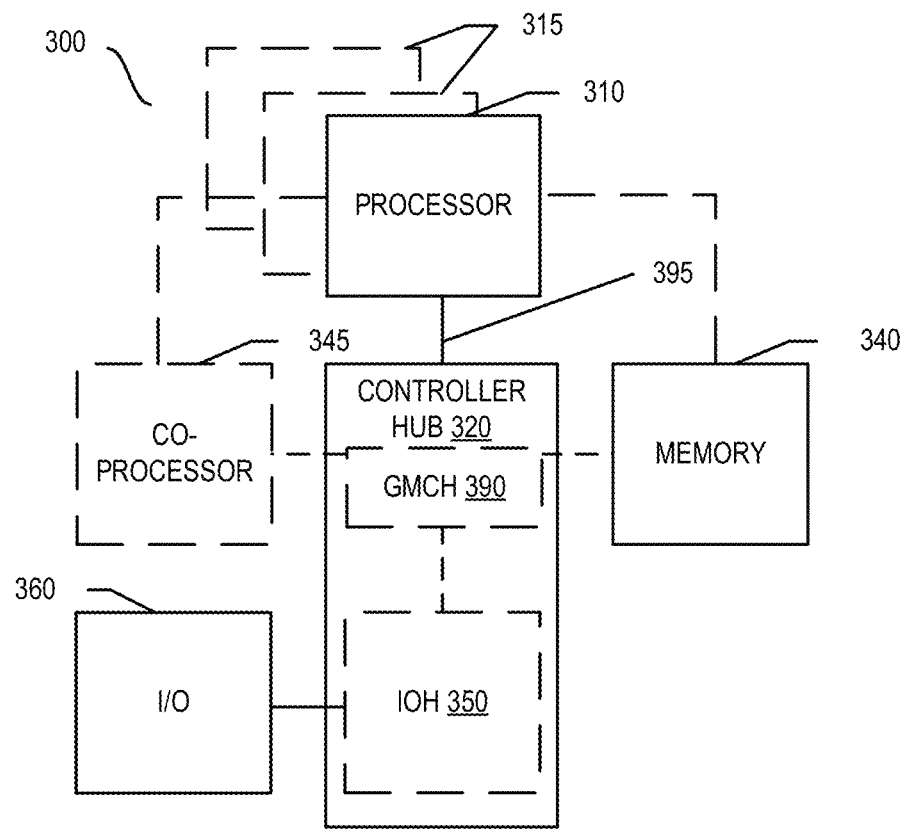
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
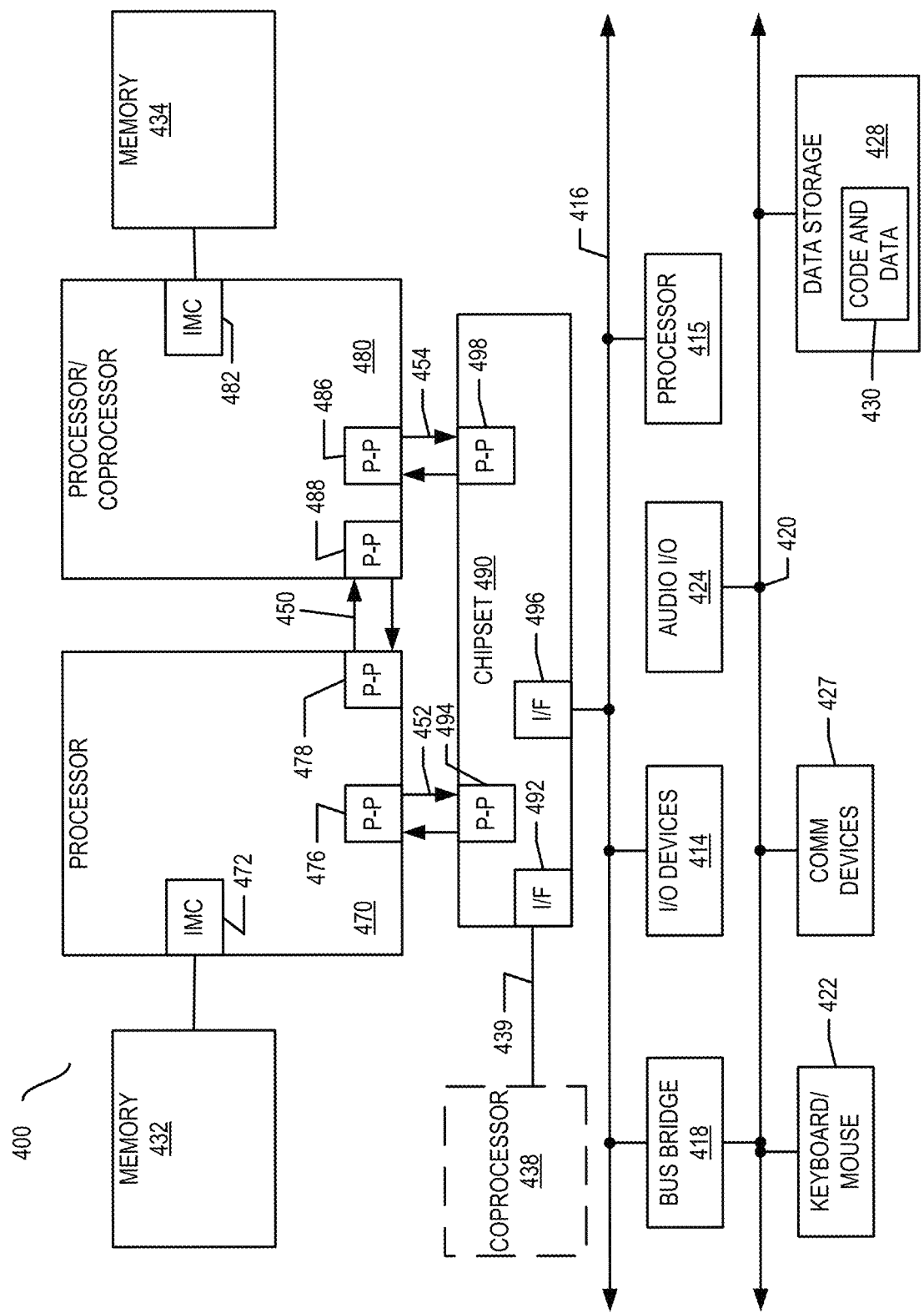
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
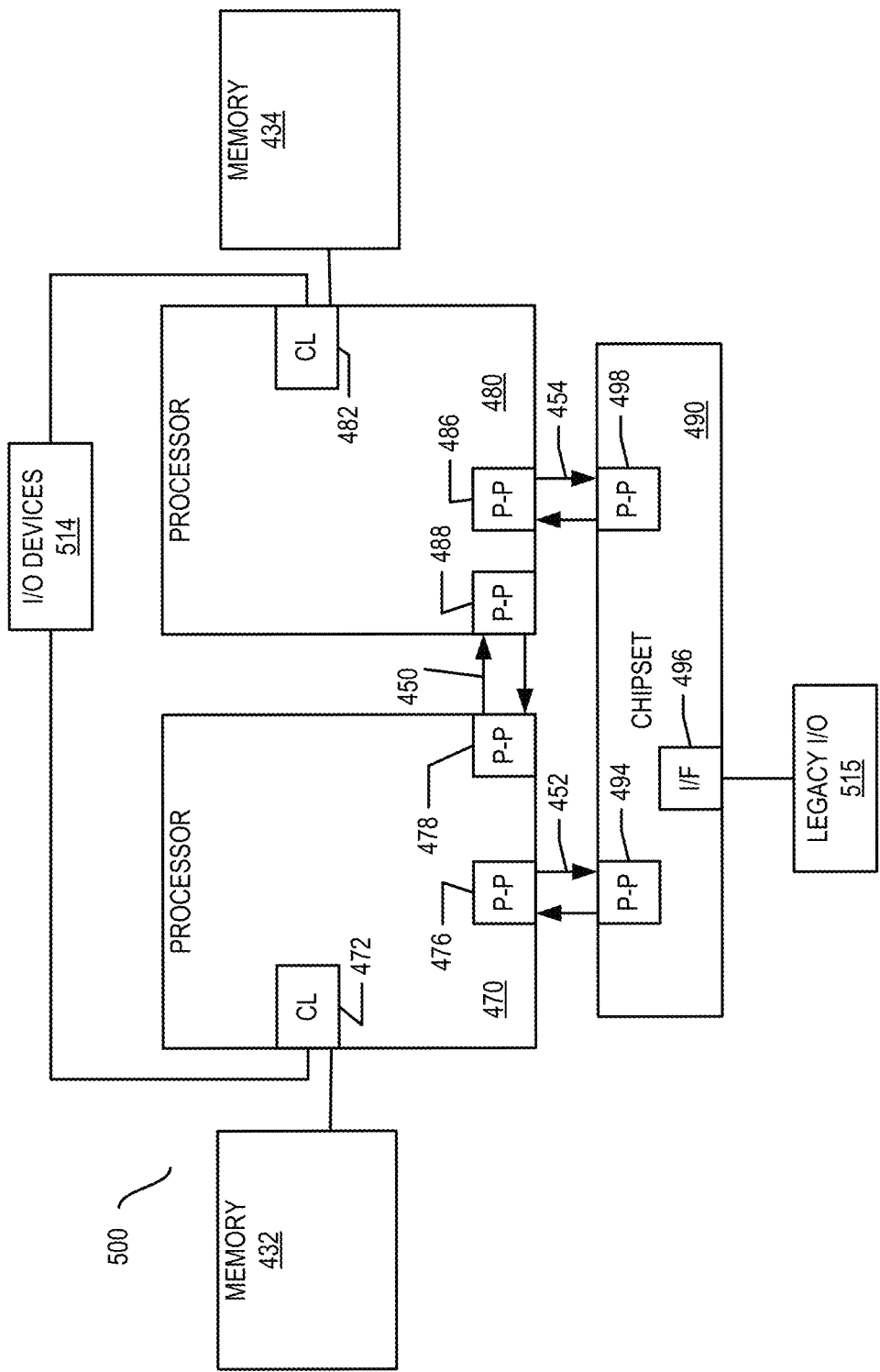
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
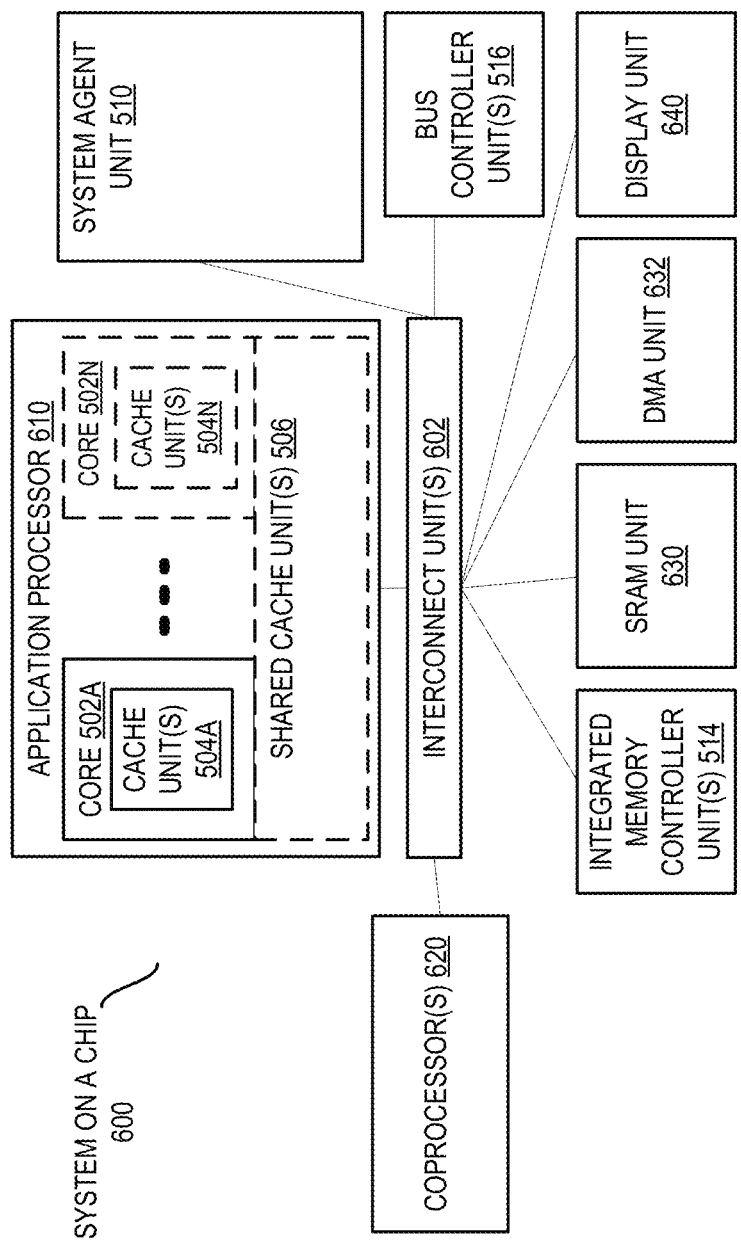
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
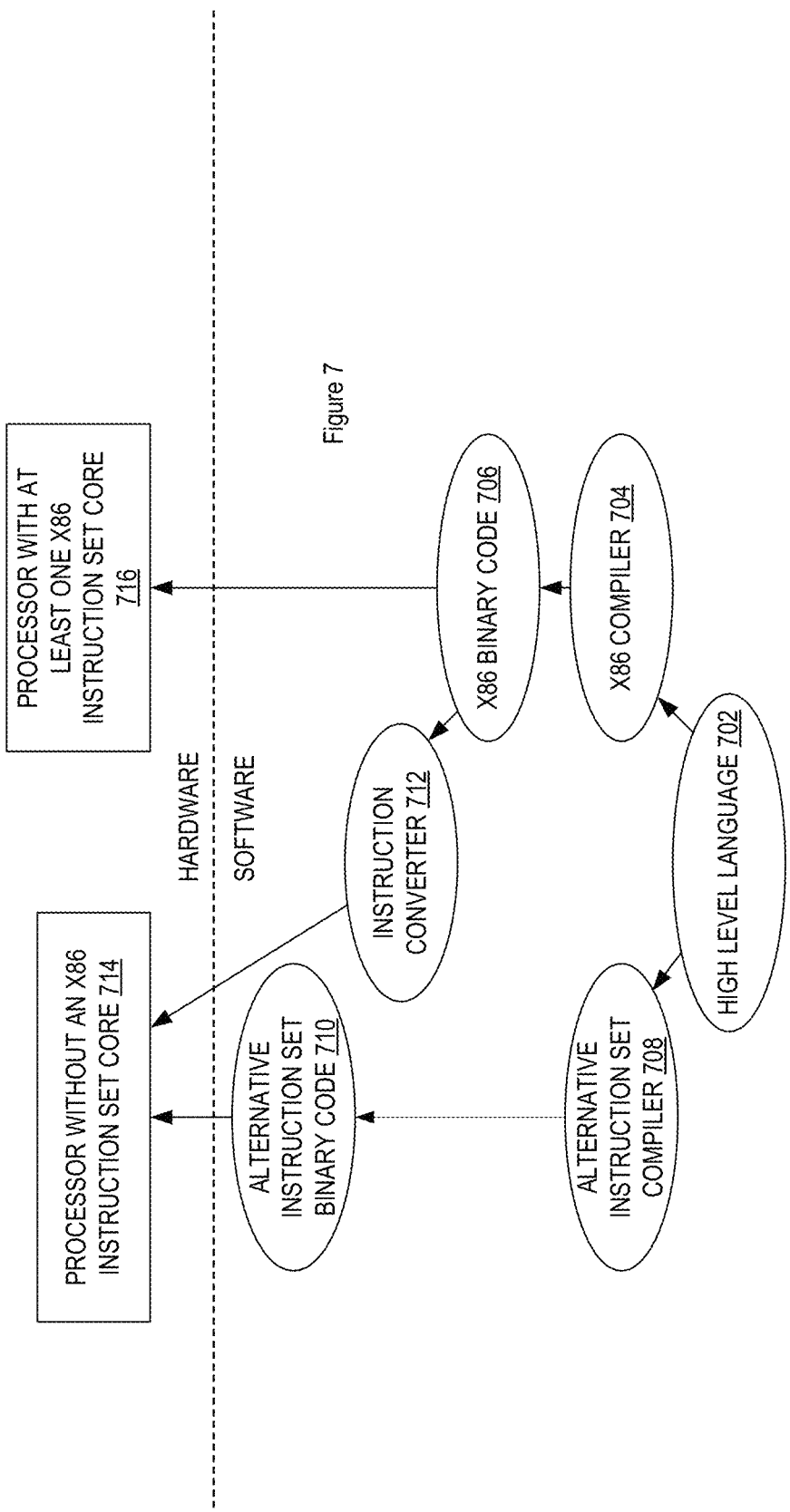
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, CA and/or that execute the ARM instruction set of ARM Holdings of Sunnyvale, CA). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Figure 8:
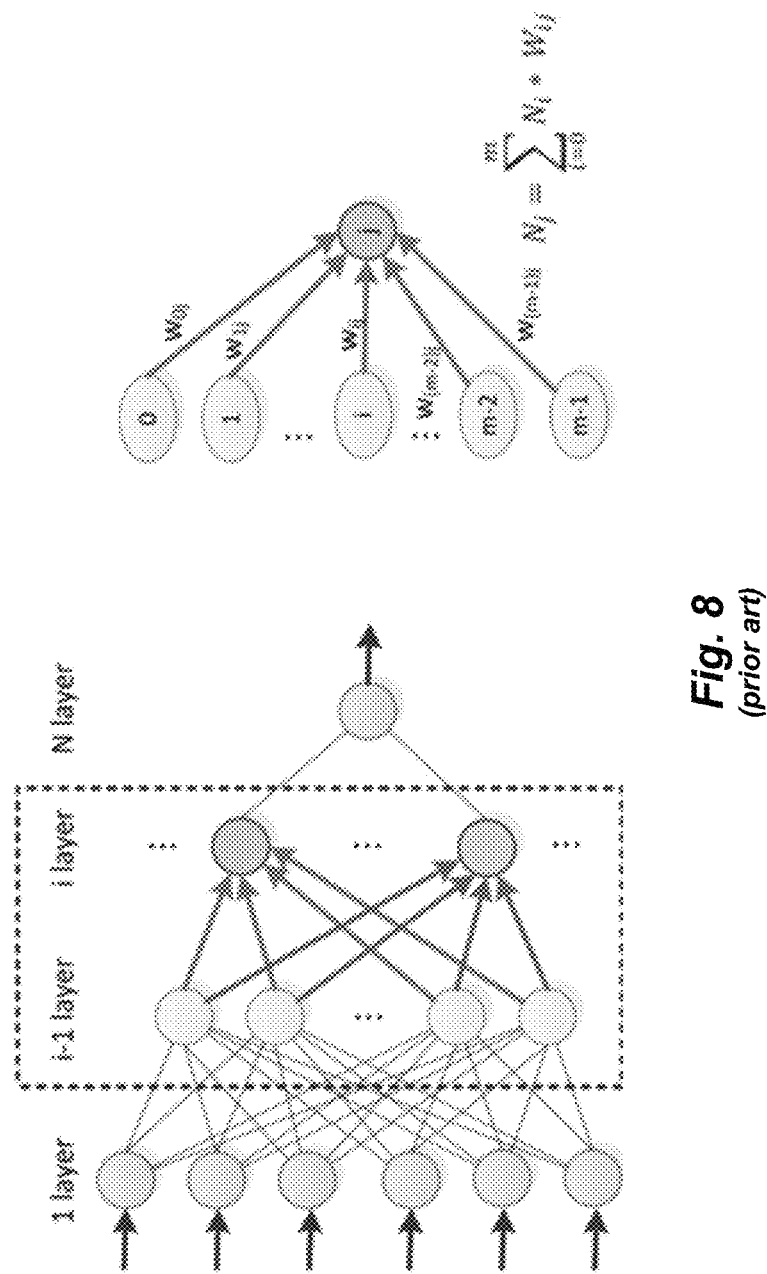
FIG. 8 illustrates a scheme of a fully-connected artificial neural network (ANN) having a plurality of layers.

Method and Apparatus for Distributed and Cooperative Computation in Artificial Neural Networks Artificial Neural Networks (ANNs) may be designed as a set of fully-connected layers that contain a large number of "neurons." Each neuron is connected with all the neurons belonging to neighboring layers through "synapses." The strength or amplitude of a connection between two neurons across a synapse is referred to as a "synaptic weight" (or just "weight"), which can be represented as a numerical value. Hence, the output of a neuron may be computed by the addition of all the input neurons from the previous layer pondered by their synaptic weight, an operation known as a dot-product. FIG. 8 illustrates a scheme of a fully-connected ANN having a plurality of layers (layer 1, layer i−1, layer I, layer N) and shows how the plurality of weights $w_{0j}$–$w_{(m-1)j}$ may be combined using a dot product operation.

Brain-inspired algorithms such ANNs may require very high computational requirements that may be prohibitive in traditional low-power devices due to their limited power budget and processing capabilities. To overcome this issue, both the industry and the academia have recently shown great interest on introducing specialized neuromorphic architectures, which offer orders of magnitude better energy efficiency than conventional approaches.

Unfortunately, proposed neuromorphic architectures require huge memory bandwidth that is not available in low-power system-on-chip (SoC) architectures. For example, it has been shown that the bandwidth required by the fully-connected layers in a simple CNN system is 120 GB/s, while the available bandwidth in SoCs is much less. Even in the case of using tiling techniques and internal memory, the bandwidth requirements remain prohibitive.

Figure 9:
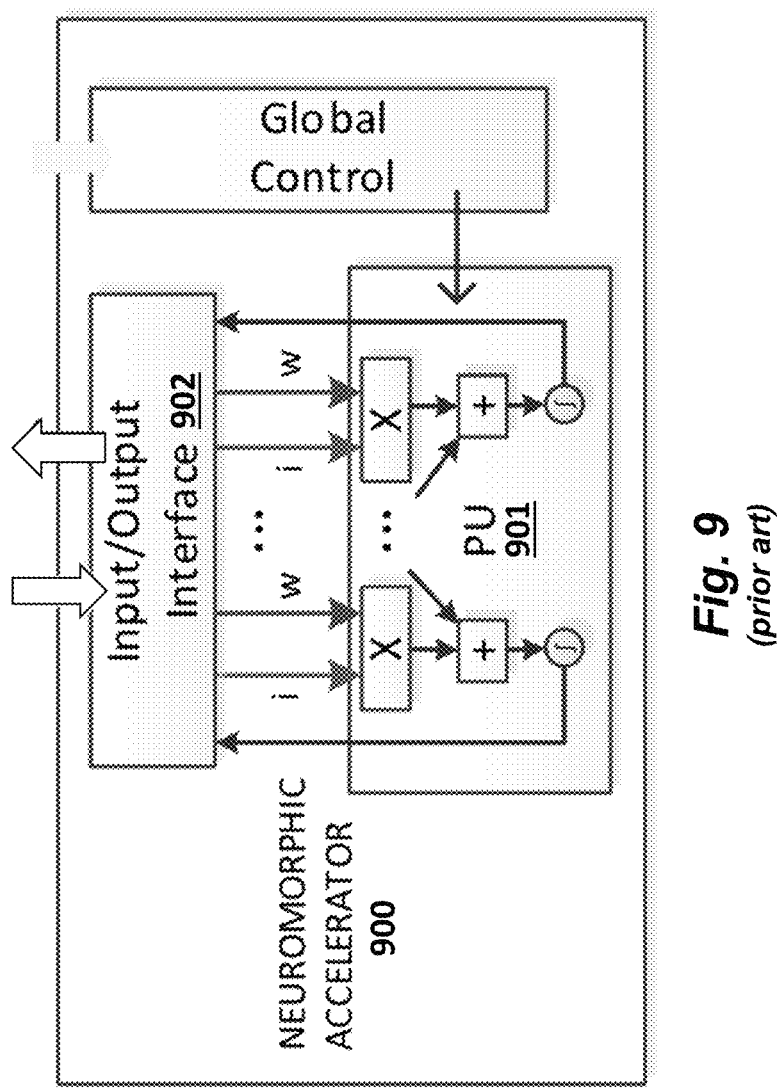
FIG. 9 illustrates an exemplary neuromorphic accelerator architecture.

FIG. 9 shows a neuromorphic accelerator architecture 900 where a single Processing Unit ("PU") 901 is in charge of computing the dot-product operation for each logical neuron and accumulating the partial results until all input neurons have been traversed and the result is final. Inputs and weights are brought to the PU 901 from an Input/Output (JO) interface 902 using point-to-point buses, which connect each element from the unit with either internal memory or the external world.

The main problem of current designs such as shown in FIG. 9 is that inputs and weights are not reused inside the PU 901. Because each logical neuron has its own weights, new data has to be fetched every cycle, adding significant traffic between the PU 901 and the IO interface 902. Moreover, as only a single logical neuron is mapped in the hardware, inputs have to be accessed again for each neuron contained in a given fully-connected layer, losing the opportunity to reuse the inputs. In addition, as both inputs and weights have to be delivered on every computation, the buses from the IO interface 902 to the PU are too wide, making the design inefficient. Making better reuse of input data and reducing the amount of data transmitted for each computation would substantially improve the energy efficiency of the architecture.

The embodiments of the invention described below include an optimized architecture to compute fully-connected neural networks very efficiently. One embodiment of the architecture consists of a set of distributed Processing Units (PUs) that work in cooperation to minimize bandwidth requirements and reduce the number of externals reads and writes. A set of specific mechanisms are implemented to (i) reuse as much data as possible inside the PUs, (ii) share data among the PUs to avoid broadcasting it, and (iii) request data in advance to avoid idle PU cycles. The scalar and modular approach allows the system to be extremely efficient in many market segments, ranging from high-performance devices to low-power devices.

ANNs can be executed either in conventional architectures (e.g. high-end processors) or specialized neuromorphic accelerators. It has been shown that the latter offers orders of magnitude improved energy efficiency compared to the former and, as such, are a better fit for power-constrained segments like SoC or wearables. Nonetheless, current neuromorphic architectures present a monolithic structure with huge bandwidth requirements, which are not available in the aforementioned domains. This barrier discourages the implementation of those accelerators in a market segment where the cognitive capabilities of ANNs would be particularly useful (e.g., mobile devices).

The embodiments of the invention described below enable the integration of neuromorphic accelerators in low-power devices, reducing data traffic by maximizing data reuse on the fully-connected operation, and reducing the width of the busses that connect PUs with IO interfaces. This design allows the system to save area (because fewer connections are needed) and power (because external memory is accessed less times). In addition, external bandwidth decreases significantly. These properties allow the embodiments of the invention to meet the physical constraints in current SoC technology.

Figure 10:
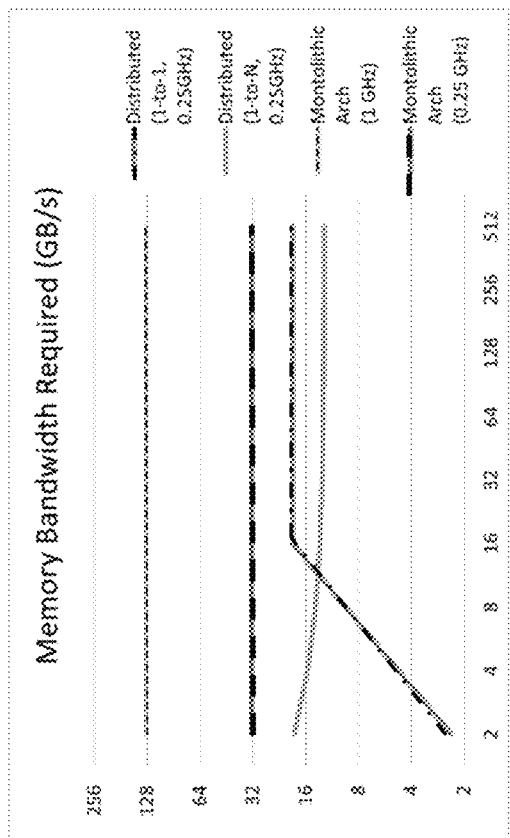
FIG. 10 illustrates the bandwidth requirements for both monolithic configurations and the embodiments of the invention which utilize distributed configurations based on the number of neurons per layer.

FIG. 10 shows the bandwidth requirements for both monolithic configurations and the embodiments of the invention, which utilize distributed configurations. The Y-axis shows bandwidth (GB/s) while the X-axis shows the number of output neurons in a given ANN layer (the number of input neurons is a fixed number). The monolithic configuration introduces a single PU that can work at 1 GHz (full speed mode) or 0.25 GHz (bandwidth saving mode) and contains 64 8-bit multiply-accumulate (MAC) units. One embodiment of the distributed configuration operates at 0.25 GHz, supports two configurations (1-to-1 and 1-to-N) and contains sixteen PUs with 4 8-bit multipliers each (for a total of 64 8-bit MAC units, the same resources as the monolithic configuration).

FIG. 10 shows that monolithic configurations require up to 128 GB/s (1 GHz) in large ANNs, and 32 GB/s when operating at a quarter of their frequency. This is a fixed number regardless the number of output neurons of the ANN layer. Low-power segments cannot support such bandwidth given that chip connections are shared among different components. By supporting both 1-to-1 and 1-to-N configurations, distributed architectures need less than 14 GB/s (maximum bandwidth requirement independent of the number of output neurons), which is 2.3× less than in monolithic architectures that operate at the same frequency and about 9.8× the bandwidth required by monolithic architectures that operate at full speed. In one embodiment, this is achieved because distributing computation among different PUs allows better data reuse and less accesses to external memory. Note that 1-to-1 configurations are better suited for ANNs with a few output neurons, while 1-to-N configurations work better when computing large ANNs with lots of output neurons. The distributed architectures presented herein support both modes of execution.

Moreover, monolithic architectures require more connections with external elements (e.g. internal or external memory) than distributed architectures. Following the configuration examples shown in FIG. 10, monolithic configurations require 128-byte wide busses for delivering 64B data and 64B weights per cycle to a single PU, while the distributed solution presented herein only requires a 20-byte wide bus that is shared among PUs to deliver 4B data and 16B weights. This results in a 75% area savings in circuitry and a similar reduction in interconnect power consumption.

Figure 11:
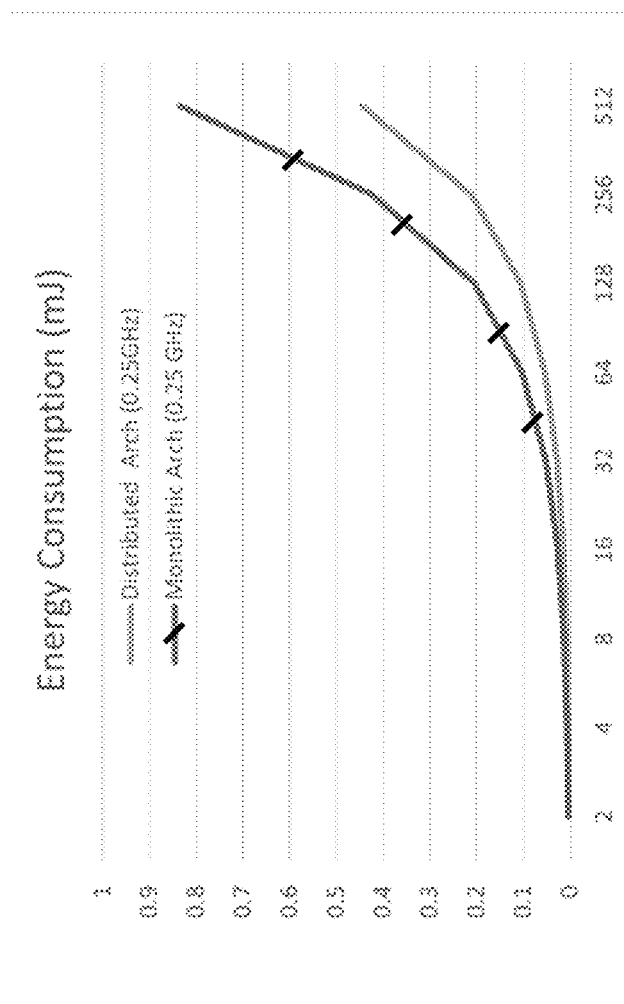
FIG. 11 illustrates a comparison between monolithic and distributed neuromorphic architectures based on the number of neurons per layer.

FIG. 11 illustrates a comparison between monolithic and distributed neuromorphic architectures where the Y-axis shows energy consumption (in mJ) and the X-axis shows the number of output neurons. Looking at the figure, the benefits on energy consumption obtained when implementing a distributed architecture can be seen, which is translated into a more than 2× energy consumption improvement. This is because accessing main memory is a power-hungry operation that can be mitigated when multiple small PUs work in cooperation.

Figure 12A:
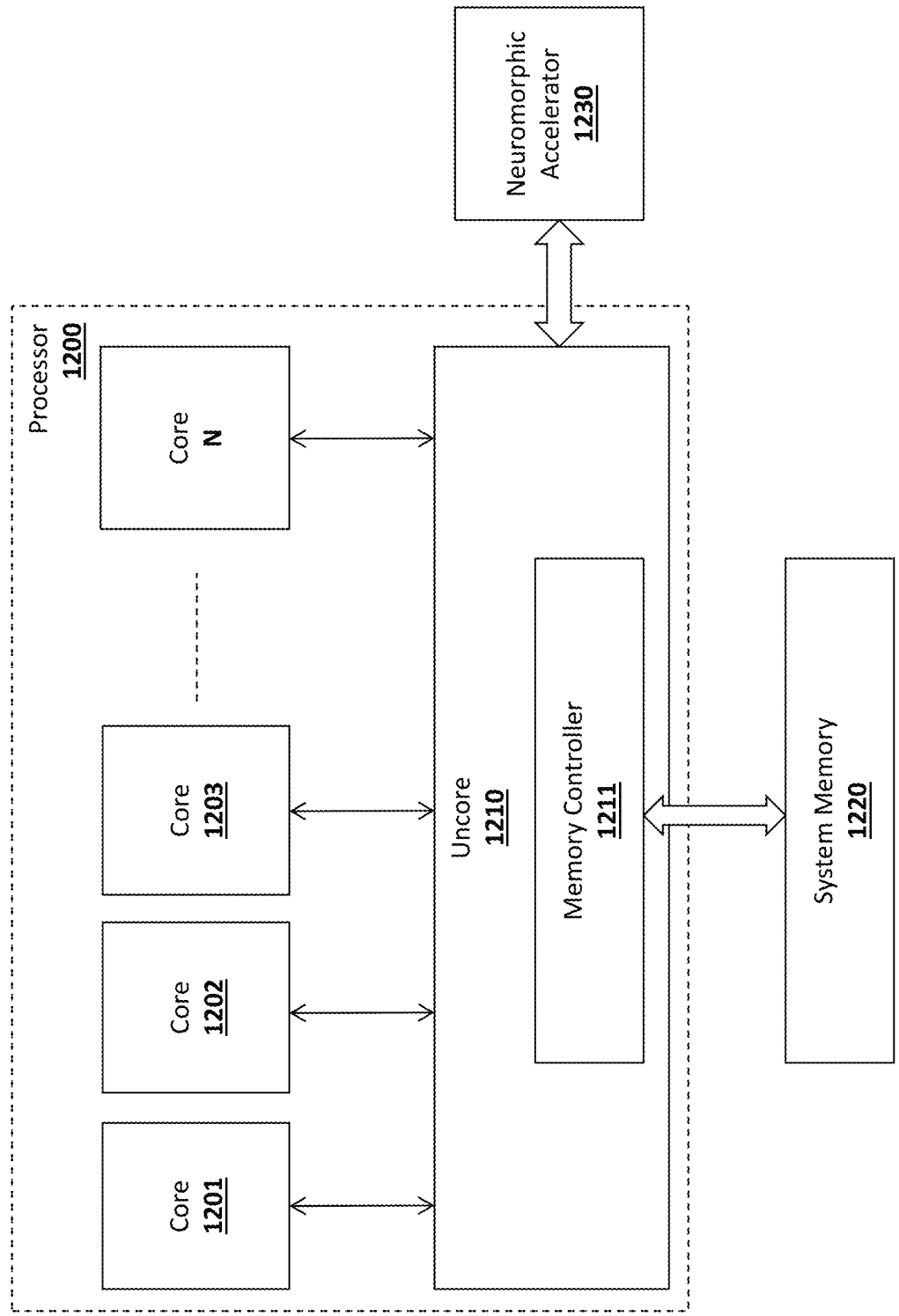
FIG. 12A illustrates one embodiment in which the neuromorphic accelerator is communicatively coupled to the processor.
Figure 12B:
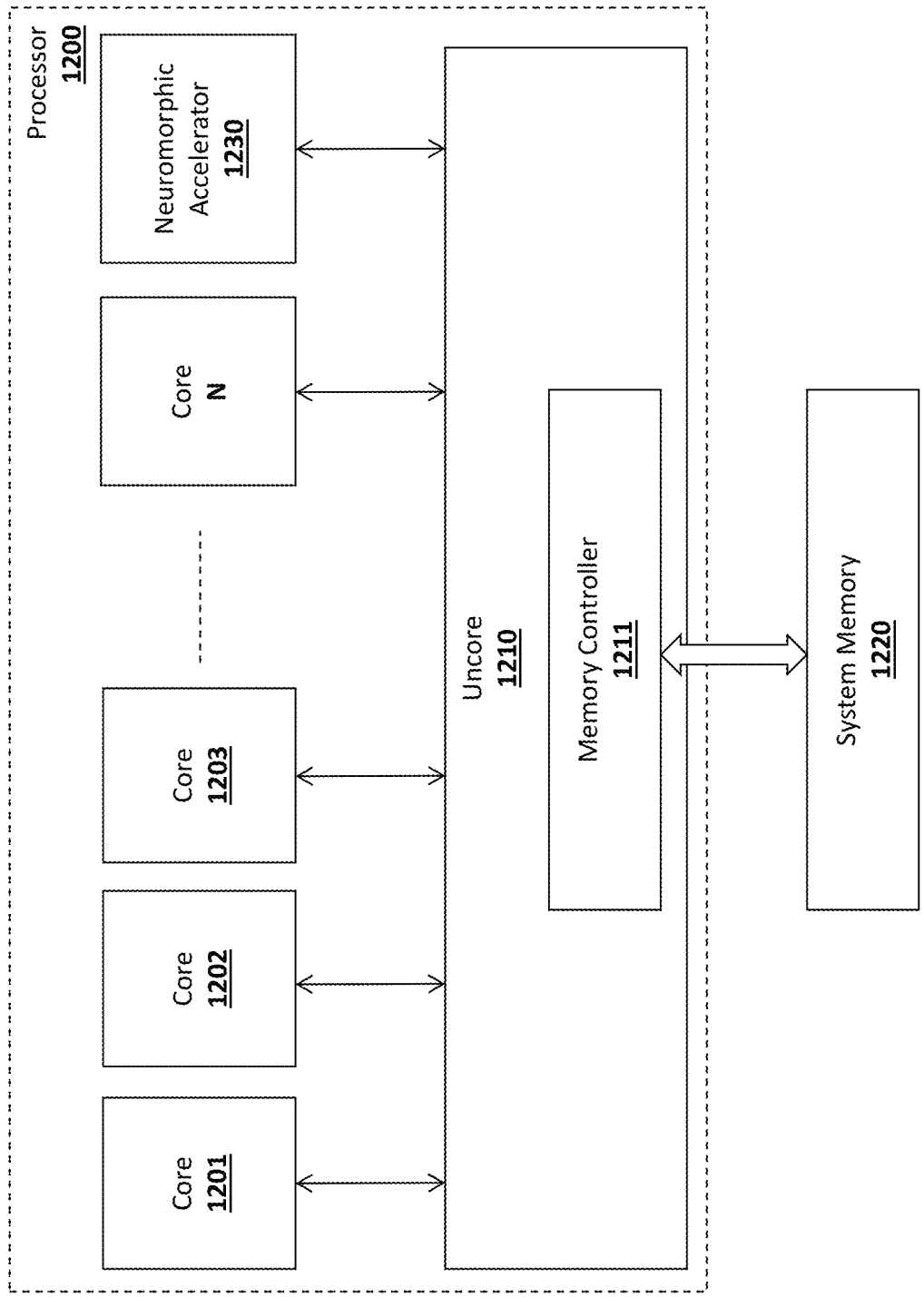
FIG. 12B illustrates one embodiment in which the neuromorphic accelerator is integrated within the processor.

FIGS. 12A-B illustrates different system architecture on which the embodiments of the invention may be implemented. Both exemplary architectures include a processor 1200 comprising a plurality of cores 1201-1203, N and an "uncore" component 1210 comprising a communication bus structure or fabric for interconnecting the cores 1201-1203, N. The uncore component 1210 also includes a memory controller 1211 communicatively coupling each of the cores 1201-1203, N to a system memory 1220 (e.g., a dynamic random access memory (DRAM) or other type of memory device).

In the embodiment shown in FIG. 12A, a neuromorphic accelerator 1230 for implementing the embodiments of the invention described herein is configured as an external accelerator coupled to the processor via a bus or communication fabric. In the alternate embodiment shown in FIG. 12B, the neuromorphic accelerator 1231 is integrated within the processor 1200. In either case, the neuromorphic accelerator 1230 is provided with access to the system memory 1220 via the integrated memory controller 1211. While these two specific architectures are show in FIGS. 12A-B for the sake of illustration, it should be noted that the underlying principles of the invention are not limited to any particular processor architecture.

Figure 13:
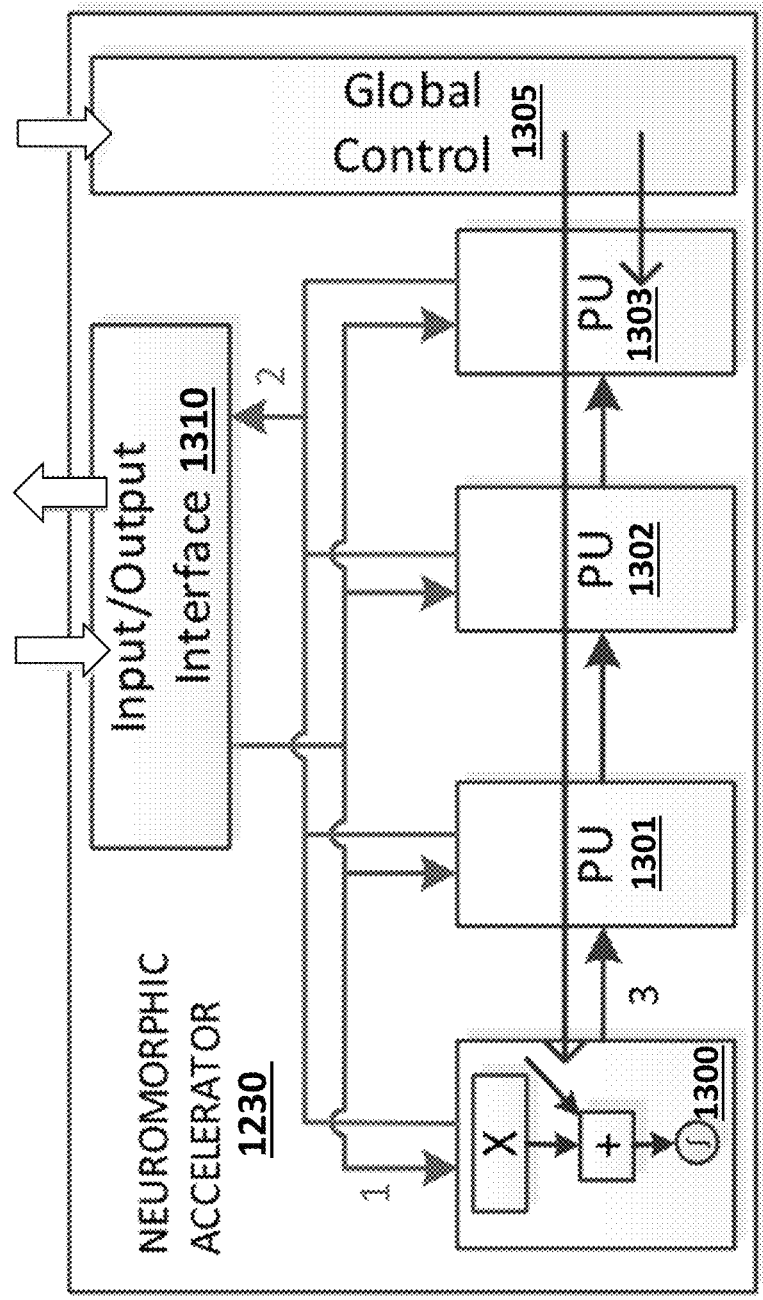
FIG. 13 illustrates one embodiment of a neuromorphic accelerator including a set of processing units (PUs)

As illustrated in FIG. 13, one embodiment of the neuromorphic accelerator 1230 includes a set of PUs 1300-1303 connected to the IO interface 1310 through a shared data and partial input bus (labeled 1 in the figure) and a shared result output bus (labeled 2). The first bus (1) is used to bring data, kernels and weights to the PUs 1300-1303, while the second (2) is used to deliver either partial or final results. The PUs 1300-1303 are interconnected using a unidirectional point-to-point (P2P) link (labeled 3), which is used to send partial computations from one PU to another. A global control unit 1305 is in charge of driving the data from the IO interface 1310 to the PUs 1300-1303, as well as configuring each PU to execute the appropriate fully-connected configuration at any point of time.

In one embodiment, in order to optimize the power/performance, the PUs 1300-1303 may operate at a lower frequency than the IO interface 1310. The underlying principles of the invention are not limited to any number of PUs 1300-1303 that share a bus and/or any particular resources contained in each PU. In one embodiment, each PU 1300-1303 contains sixteen 8-bit multipliers, and the architecture includes four distributed PUs 1300-1303 that work in cooperation. Various bus widths may be employed but, in one particular embodiment, the width of shared data input bus (labeled 1 in the figure) is 20B.

There are numerous benefits to the cooperative approach illustrated in FIG. 13 over the monolithic neuromorphic architecture shown in FIG. 9. First, the monolithic architecture embodies all processing elements (MAC units and specific circuitry) in a single PU, while the embodiments of the invention distribute computation among multiple PUs 1300-1303, requiring internal latches and specific communication channels between PUs to exchange partial results. Second, a monolithic architecture requires a wider bus between the PU and the IO interface to send/receive as much data as possible per cycle, while the embodiments of the invention share a bus among PUs. Third, the embodiments of the invention introduce some internal latches that are used to reuse data inputs and to store other data required by future computations. Last, in one embodiment, the PUs 1300-1303 operate at a lower frequency when executing fully-connected layers to satisfy bandwidth constraints (although other layers can operate at full speed). Assuming four PUs 1300-1303 hanging from the same bus, each PU may operate at a quarter the bus frequency (1 PU cycle=4 bus cycles). Note that in one embodiment, the PUs 1300-1303 remain operative all the time, although less data per second is sent.

Figure 14A:
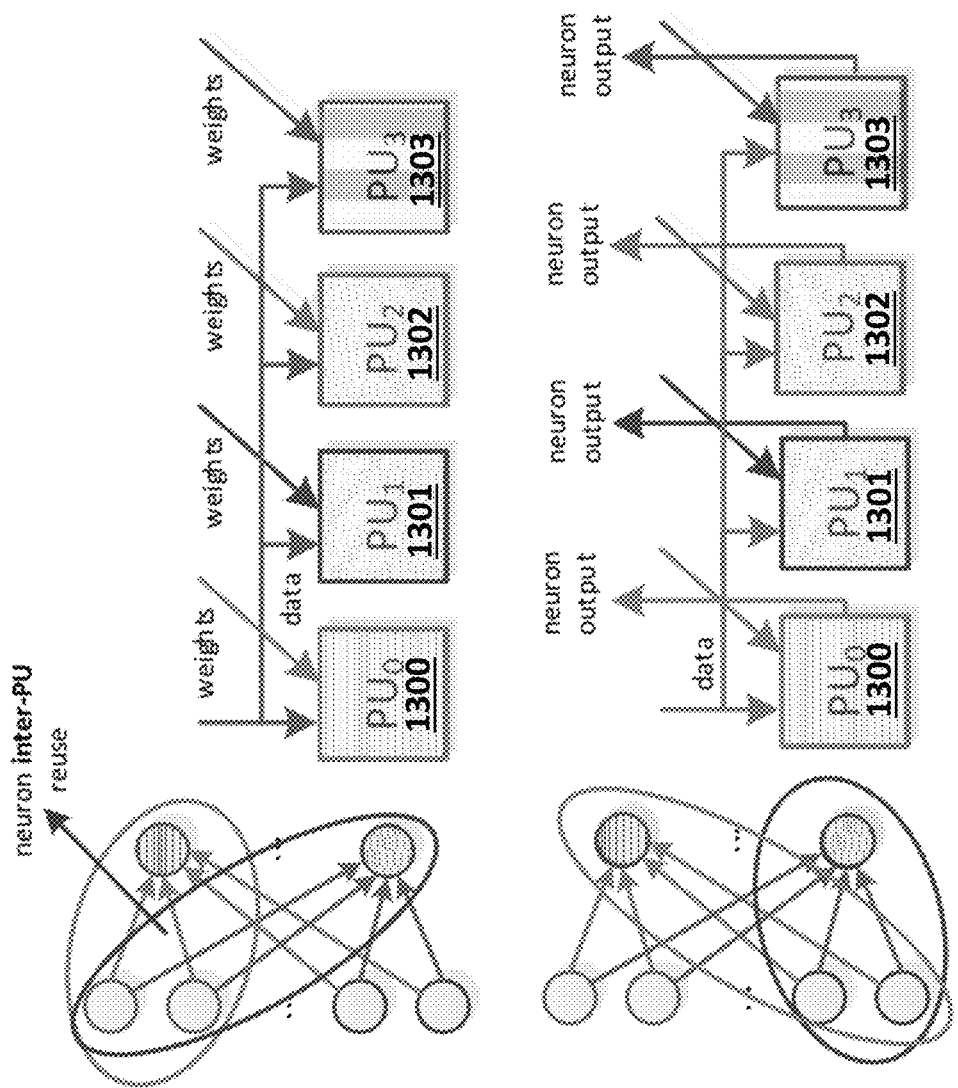
FIGS. 14A-B illustrates how fully-connected 1-to-1 operations may map in accordance with one embodiment of the invention.
Figure 14B:
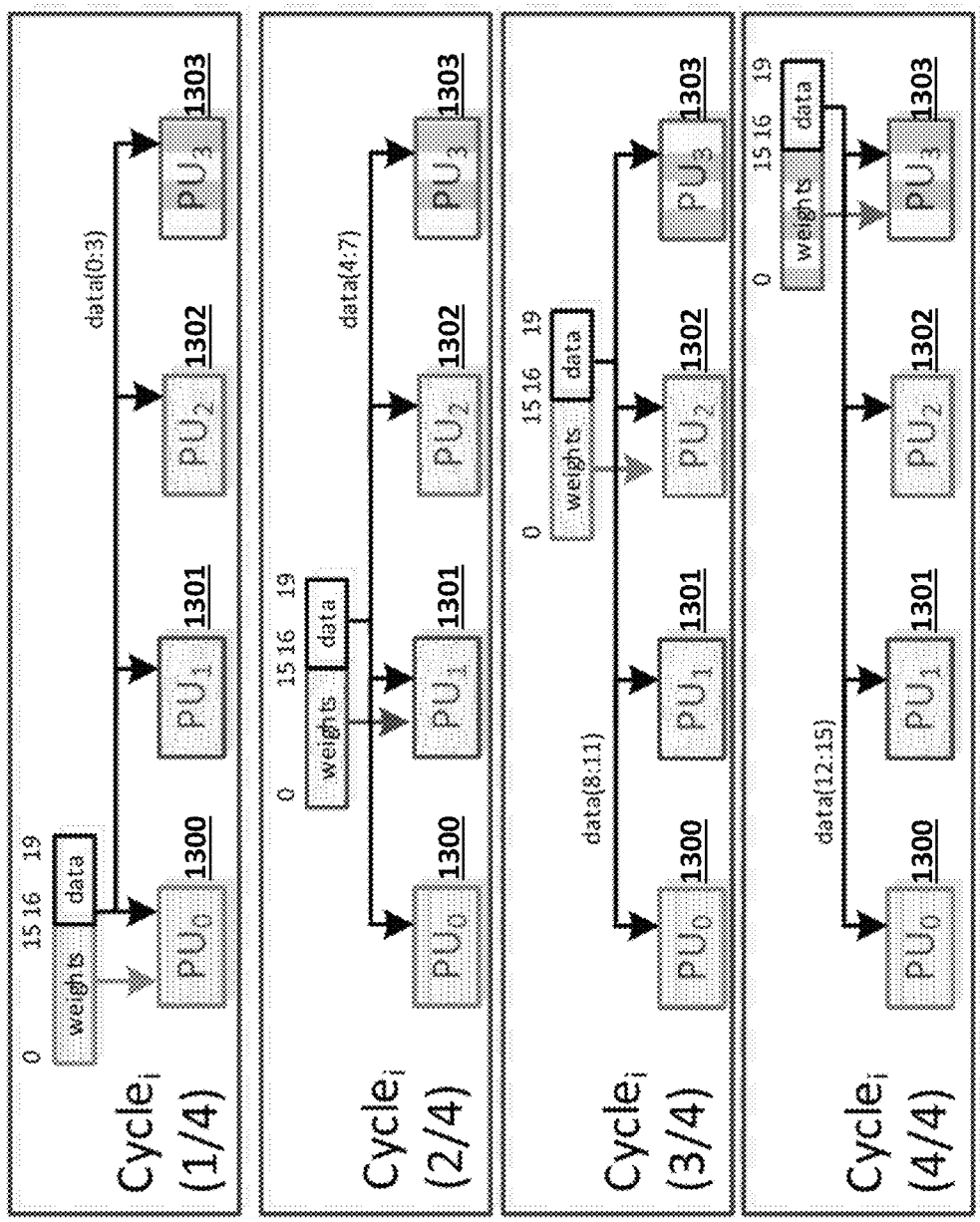

As mentioned, one embodiment of the invention supports two modes of execution: (1) fully-connected 1-to-1 and (2) fully-connected 1-to-N operations. As explained above, depending on the targeted ANN configuration, it may be more suitable to execute in one mode or in the other mode. The main difference between the execution modes lies on the way inputs and weights are processed. While the first mode requires inputs and weights to reach a given PU 1300-1303 at the same time, the second mode loads the inputs of a neuron first and then traverses the output neurons by only fetching weights every cycle. FIGS. 14A-B illustrate how fully-connected 1-to-1 operations may mapped in accordance with one embodiment of the invention and FIGS. 15A-B illustrate how fully-connected 1-to-N operations may mapped in accordance with another embodiment of the invention.

Turning first to FIGS. 14A-B, the fully connected 1-to-1 operation maps one logical neuron to one physical neuron that is computed in a single PU 1300-1303. To perform the dot-product operation, both the input neurons and the synapses (weights) 1400-1403 are sent. As each neuron requires its own weights, both input neurons and weights have to be fetched for every operation. Each entity that hangs from the bus receives their weights (encoded using 16B in one embodiment) packed together at a different time. Nonetheless, input neurons are shared among PUs 1300-1303, and thus they can be broadcasted to avoid reading from the IO interface 1310 multiple times, requiring only 4B per PU cycle. Hence, the total bandwidth requirements for the illustrated embodiment is 20B at a time, as shown in FIG. 14B. Thus, in FIG. 14B, after four PU cycles (1-4), all the PUs 1300-1303 have both the inputs and weights required for the computation (a total of 128B in the illustrated embodiment), so they can perform the dot-product operation and accumulate the result with the previous computation if the neuron has many inputs. In one embodiment, only when the last inputs of the logical neuron are processed do the PUs 1300-1303 send back the outcome result to the IO interface 1310.

Figure 15A:
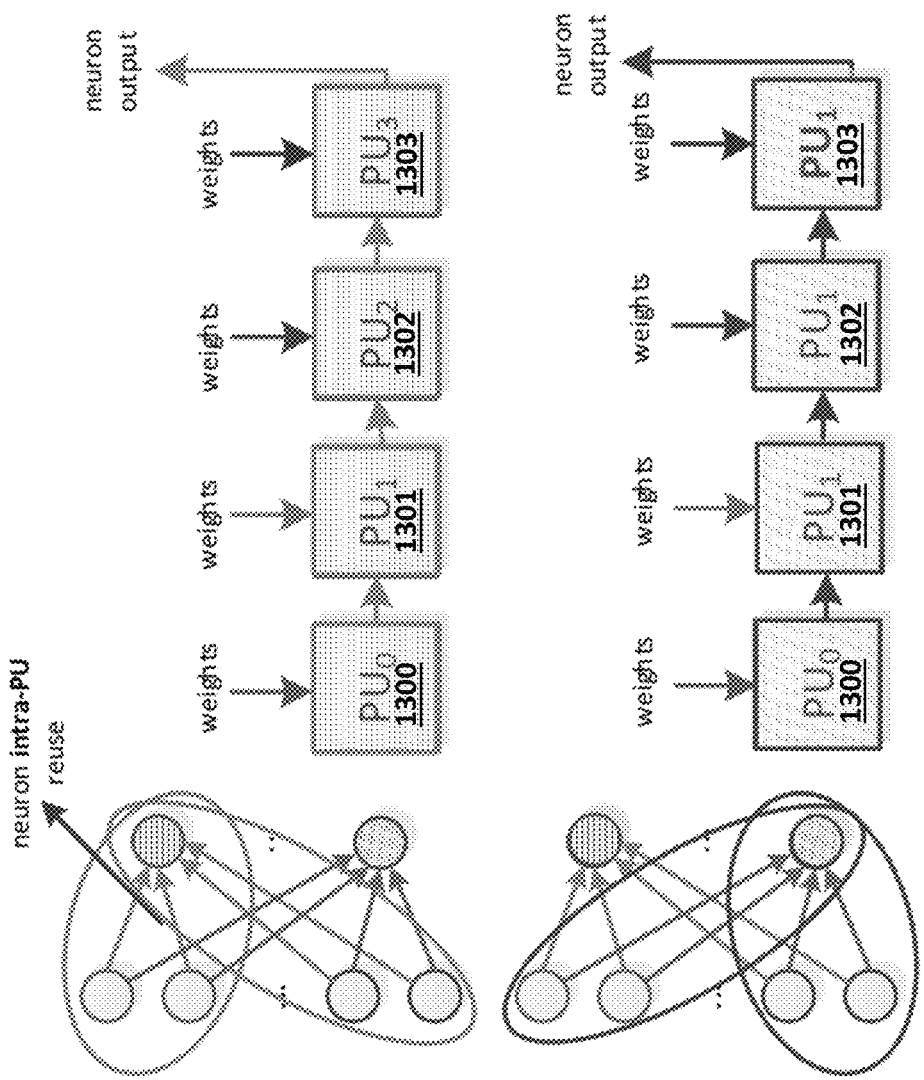
FIGS. 15A-B illustrates how fully-connected 1-to-N operations may map in accordance with another embodiment of the invention.
Figure 15B:
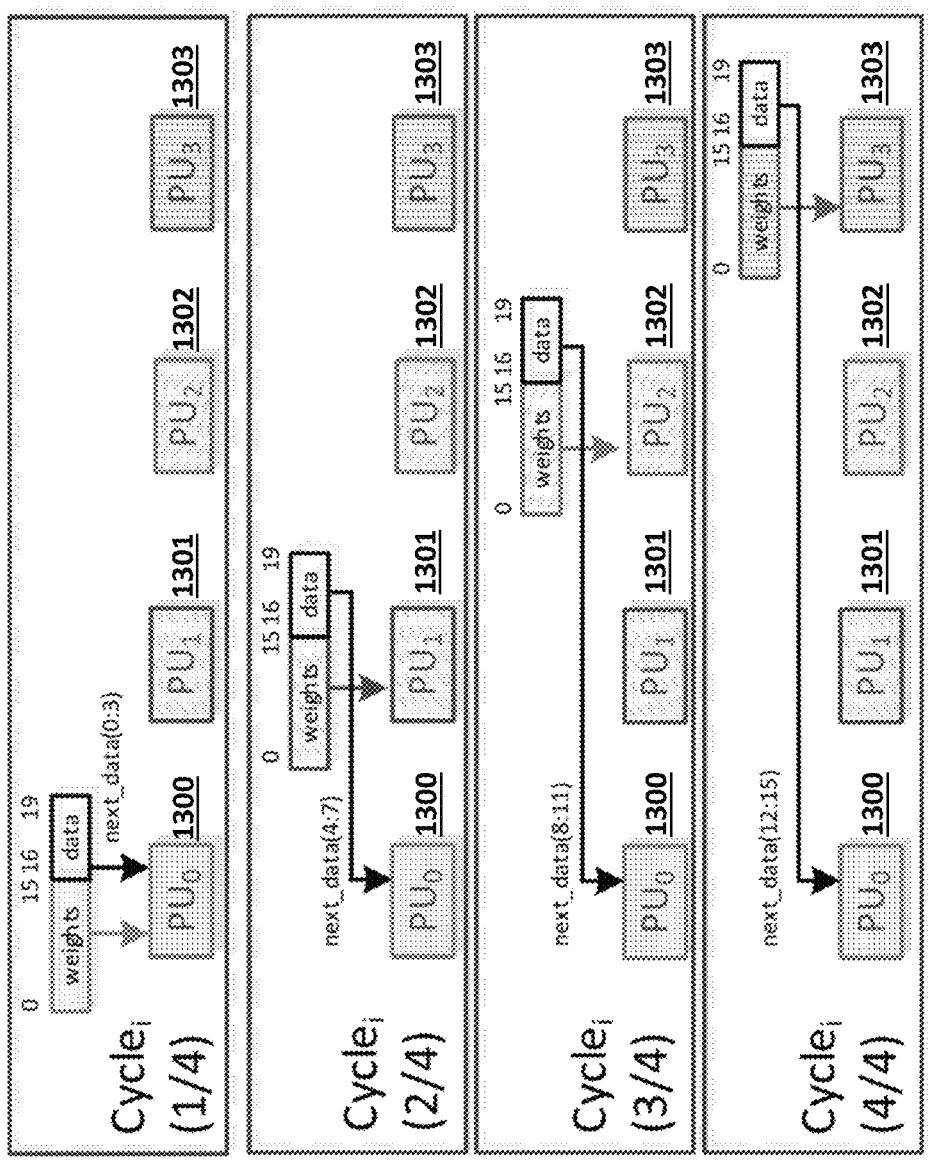

Turning now to the fully-connected 1-to-N operation illustrated in FIGS. 15A-B, when operating with many input neurons, the PUs 1300-1303 can be configured to map one logical neuron in multiple physical neurons and thus be more efficient. In this approach, each PU 1300-1303 computes just a subset of the logical neuron, and passes the partial result to the contiguous PU which accumulates its own computation with the previous results. Hence, the final outcome of the neuron is only available in the last PU.

Note that PUs 1300-1303 may compute a different logical neuron each cycle. That is, they require new weights but they do not fetch the values again from the input neurons, which are kept in local latches to increase data reuse. FIG. 15B shows how inputs and weights are distributed when operating using the 1-to-N configuration. Like in the 1-to-1 case, the PUs 1300-1303 may also operate at a quarter of their maximum frequency. Nonetheless, inputs are not broadcasted every PU cycle; they are only sent when changing input neurons (e.g. when a new layer needs to be computed). To avoid idle cycles, the IO interface 1310 may send inputs for the logical neuron to be computed next in advance and the values are latched internally in the PU until they are actually used. As shown in FIG. 15B, those inputs are sent in separate PU cycles and, together with the weights, are only consumed by a single PU. Hence, in the illustrated embodiments, a 20B-wide bus is sufficient to sustain the whole computation.

While several specific architectural examples are provide above for the purpose of explanation, the underlying principles of the invention may be implemented in a variety of different architectures including mobile devices (e.g., smartphones), tablets or wearable devices equipped with cameras or microphones. In fact, these embodiments may be implemented on any form of device to reduce the bandwidth requirements of machine-learning algorithms and improve energy-efficiency on novel computer paradigms like Artificial Neural Networks (e.g., Convolutional Neural Networks or Deep Belief Neural Networks).

Storage Device and Method for Performing Convolution Operations

Image Processing is growing in importance in the design of System-On-Chip (SoC) architectures. Image Signal Processors (ISPs) in mobile devices are responsible for handling increasingly larger images and are expected to maintain or reduce their power budget. Convolutional Neural Networks (CNNs), biologically inspired algorithms that are gaining interest due to their application in novel human-computer interfaces, also make extensive use of 2D convolutions. Currently, the best object recognition algorithms makes use of Convolutional Neural Networks and have achieved recognition rates significantly better than previous top-performing algorithms.

Figure 16:
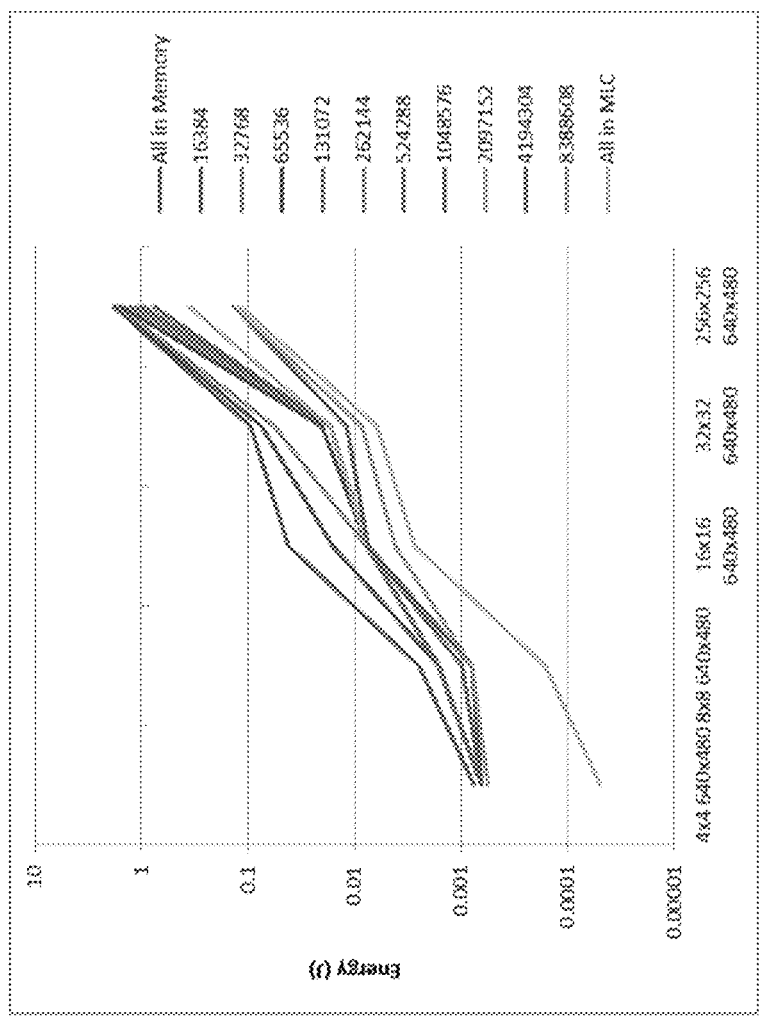
FIG. 16 illustrates the required energy to perform a convolution of varying filter sizes and multiple memory sizes.

Because convolution operations rely on a high reuse of data, they greatly benefit from having dedicated storage. FIG. 16 shows the required energy to perform a convolution of varying filter sizes and multiple memory sizes. It can be seen that the required energy can be reduced by an order of magnitude, especially for large filter sizes where the required data does not fit in the processing unit. Therefore, if there is a sufficient area budget it is desirable to utilize a specialized storage in the accelerator in order to increase the overall energy efficiency.

Figure 17A:
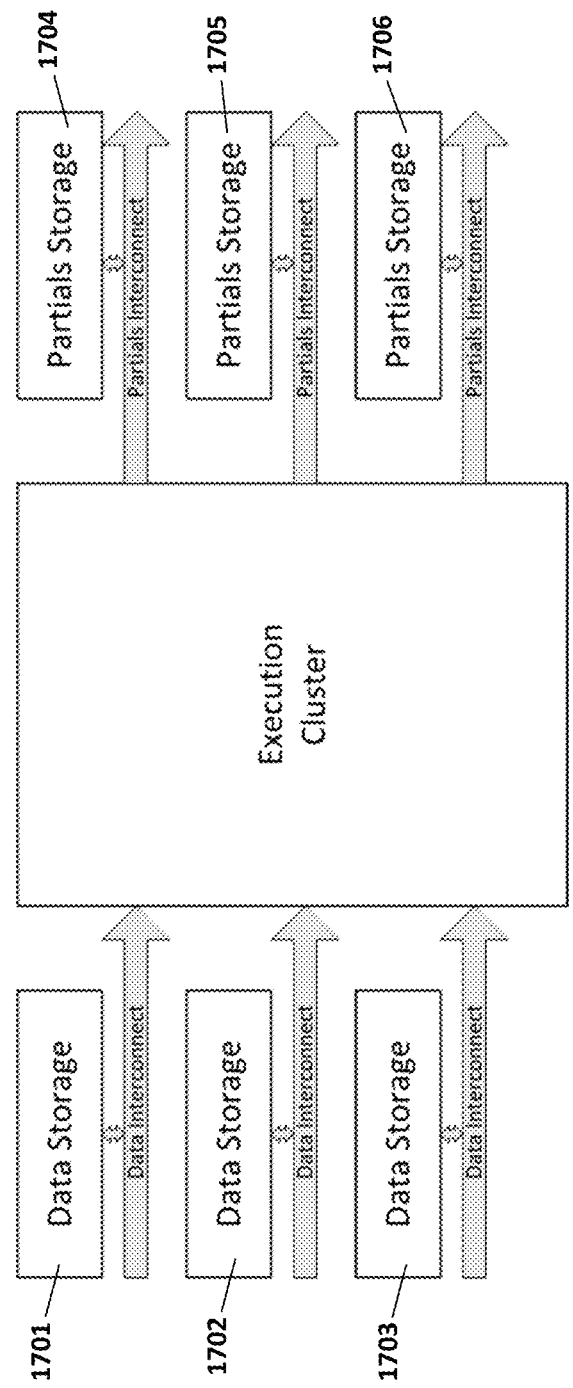
FIGS. 17A-B illustrates different storage arrangements for an execution cluster.

Several accelerators for these kinds of applications have been proposed in the industry and academia and most rely on dedicated storage areas 1701-1706 for different types of data and processing units as illustrated in FIG. 17A. However, as discussed below, for a fixed amount of storage, the optimal memory mapping changes depending on the problem type and size. Therefore, having a static memory partition leads to suboptimal memory usage.

Figure 17B:
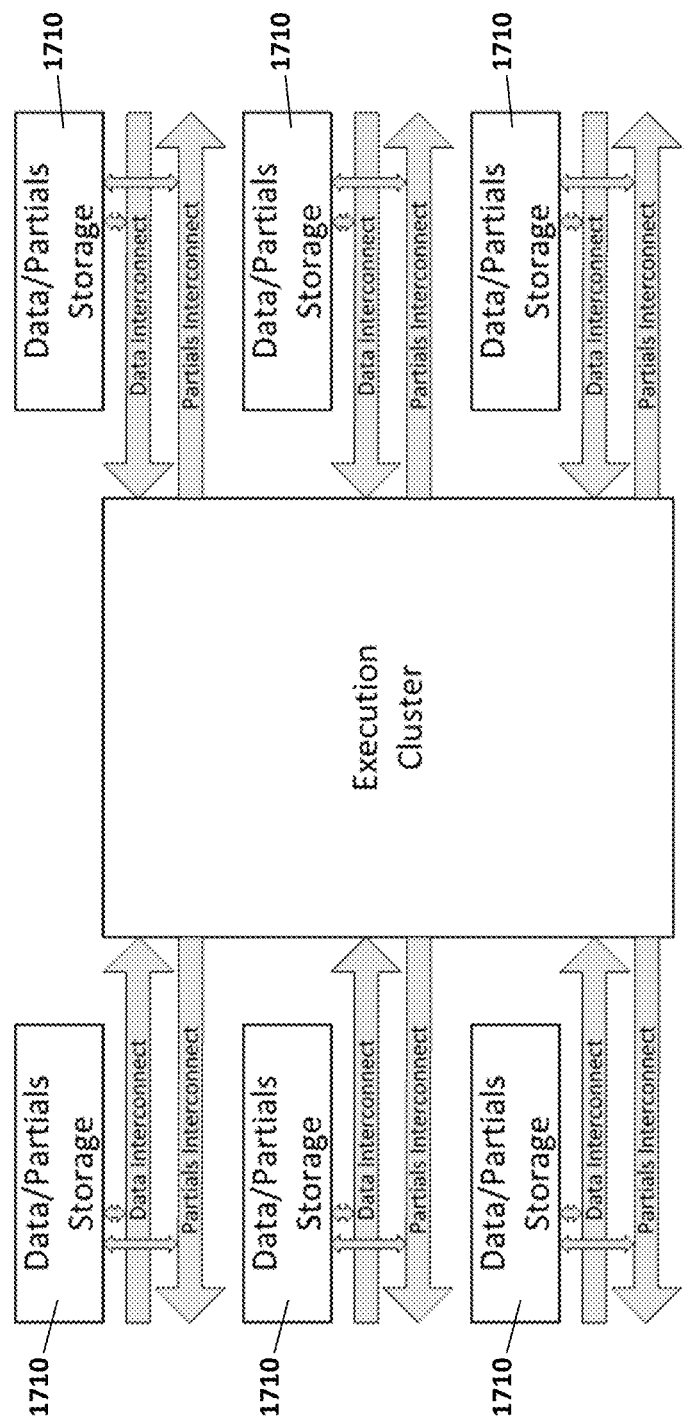

A straightforward solution to this problem is to have a unified storage area 1710 with multiple read/write ports devoted to the different types of data as shown in FIG. 17B. However, the area and energy consumed by the memory banks significantly increases with the number of ports. Array area can be doubled and both dynamic and leakage energy can increase by approximately 35% just by adding one extra port. Moreover, if a minimum Quality of Service is required for both types of data, dedicated interconnects or virtual channels should be assigned to each type of data.

Therefore, memories of existing accelerators are limited by two conflicting targets. Dedicated memories 1701-1706 are simple and energy efficient but do not provide an efficient, adaptable use of storage. In addition, shared memories 1710 may adapt to problem requirements but require more complex and less efficient memory arrays and interconnects.

The embodiments of the invention described below include a scratchpad memory design for hardware convolvers and neural network accelerators. These embodiments are able to use simple one port memory arrays and a shared interconnect and are also capable of adapting the memory assignment based on the problem/application.

Figure 18A:
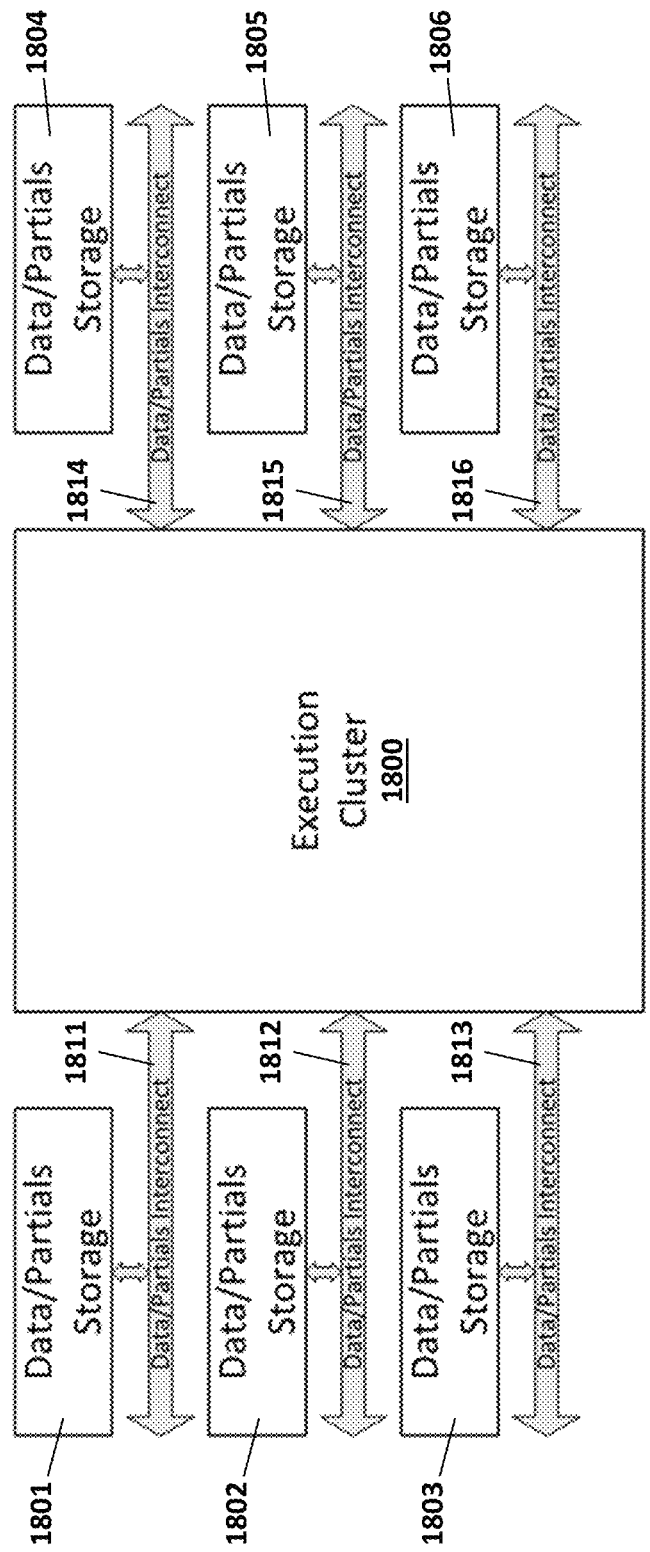
FIG. 18A illustrates one embodiment of a memory organization where memory banks and interconnects are shared among different types of data.

FIG. 18A illustrates one embodiment of the memory organization where memory banks 1801-1806 and interconnects 1811-1816 are shared among different types of data (e.g. the input image and partial results) executed within an execution cluster 1800 (e.g., comprising a plurality of processing units (PUs)). Since the access patterns are well known for a specific problem, no tags are needed in the memory arrays, saving a significant amount of area and energy. The percentage of the storage that is devoted to each type of data can be changed depending on the problem requirements, so its usage is optimized.

Figure 18B:
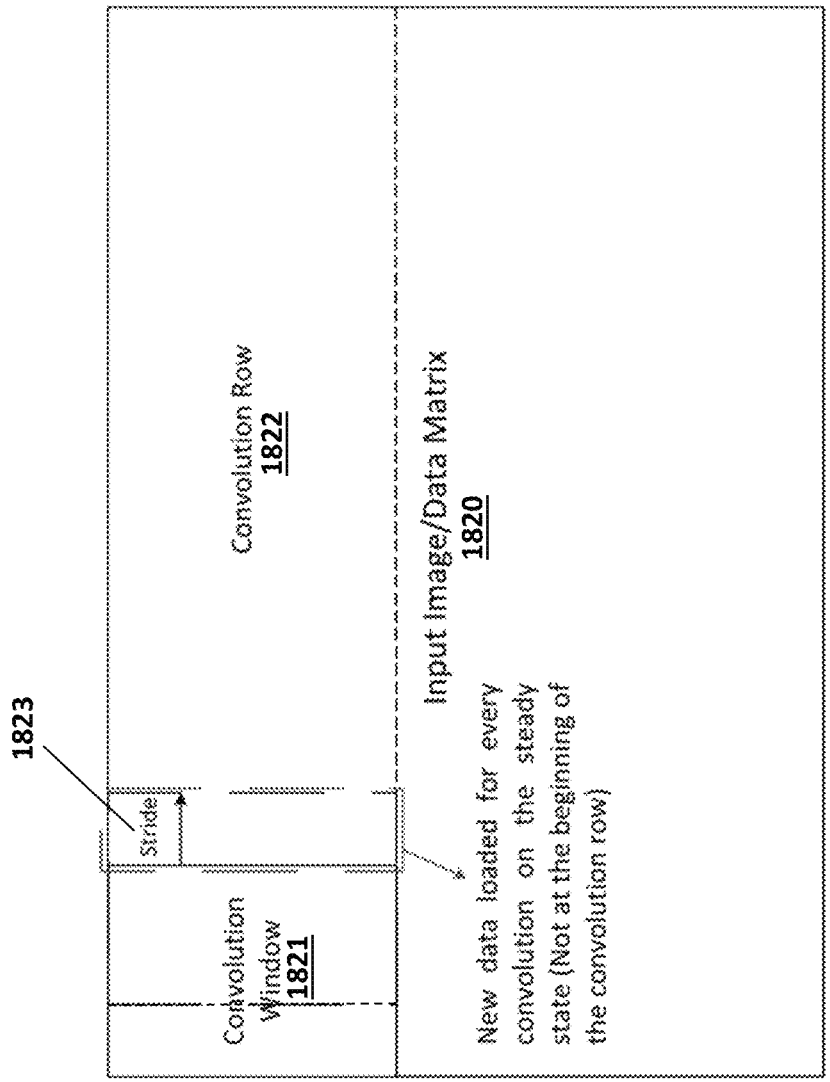
FIG. 18B illustrates an exemplary image on which a filter may be applied in accordance with one embodiment.

Independence between the two types of data can be achieved, taking advantage of the regular access patterns of convolution operations. FIG. 18B shows an image 1820 on which a filter will be applied. In a given cycle of the convolution, the logic units must have the data of the convolution window 1821, which is based on the filter size and the number of instances of the filter to be processed simultaneously. This convolution window 1821 moves to the right on each convolution operation based on the stride 1823 and within a convolution row 1822 until it reaches the edge of the image 1820. When the edge of the image is reached the convolution window 1821 moves down and processes the next convolution row. This process is repeated until the end of the image is reached. On the steady state operation of the convolver, most of the convolution window 1821 is reused and only the part that is new needs to be loaded from memory. The data that needs to be loaded every cycle depends on the problem and is determined by the convolution window 1821 height and by the stride 1823.

Figure 19:
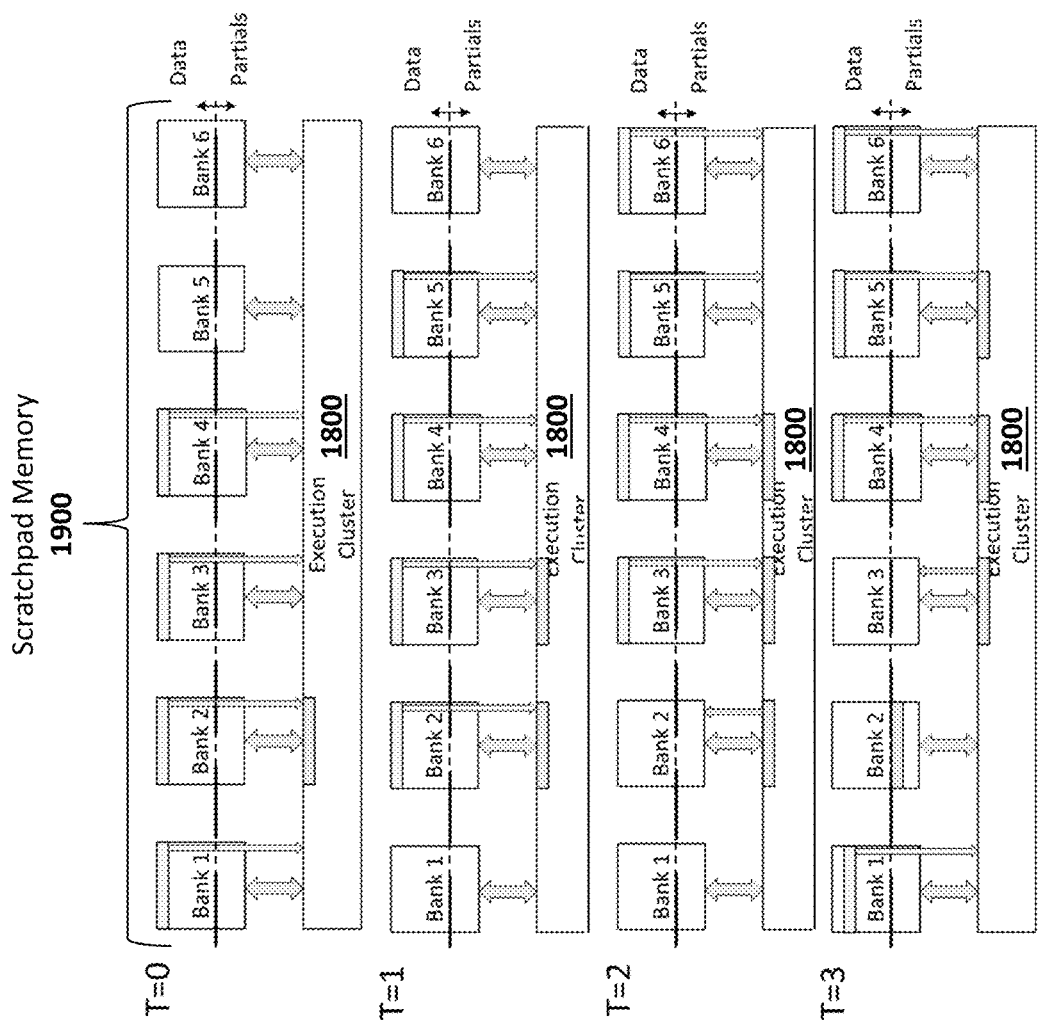
FIG. 19 illustrates a scratchpad memory comprising a plurality of banks in accordance with one embodiment of the invention.

In order to achieve the desired Quality of Service for the two types of data, one embodiment of the invention uses a mapping that ensures complete independence between the two data types (typically input data and partial results). FIG. 19 shows the principle of operation of a scratchpad memory 1900 comprising a plurality of banks 1-6 in accordance with one embodiment of the invention. One idea of this mapping is to allocate the data in a way such that different banks 1-6 are accessed in every cycle. Four cycles are shown from T=1 to T=4. In the illustrated example, bank 2 is accessed at T=0; banks 2 and 3 are accessed at T=1; banks 2-4 are accessed at T=2; and banks 3-5 are accessed at T=3. One technique maps each line of the image/matrix so that it starts in a different bank for every contiguous operation. This way, if a column of N elements needs to be read in the steady state, all can be read in one cycle since they are in different banks. This mapping also ensures that every cycle we will access N banks and that these banks are going to change for every access.

Since banks are accessed in a regular and uniform way, any partial result that needs to be stored will proceed before a maximum time that is fixed and known. In one embodiment, partial results are, therefore, buffered in small input buffers until they can access their destination bank. The fact that partial results can be stalled for some cycles is not a problem because they are not in the critical path.

Thus, one embodiment of the invention comprises a unified scratch pad memory 1900 used for two types of data in convolution accelerators, input data and partial results. In this scratchpad memory all banks are partitioned in two areas (input data and partial results) and the amount devoted for each data type can be changed depending on the problem/application. Sharing the available storage capacity allows an optimal use for all problem sizes, leading to lower bandwidth requirements and lower energy per operation.

The embodiments of the invention also include a mapping technique that ensures a minimum Quality of Service for both types of data, even when using memory banks with only one Read/Write port and a shared interconnect. Allowing the usage of memory banks with only one port reduces the required area and energy of the scratchpad memory 1900.

One advantage of this unified design is that it achieves optimal utilization of the available capacity of the scratchpad memory 1900, and most importantly, without requiring multi-ported memory banks or additional array buses that typically require more area and consume more power. Additionally, better scratchpad memory utilization results in a significant external-memory bandwidth reduction, and therefore lower power and energy consumption.

Figures 20A, 20B:
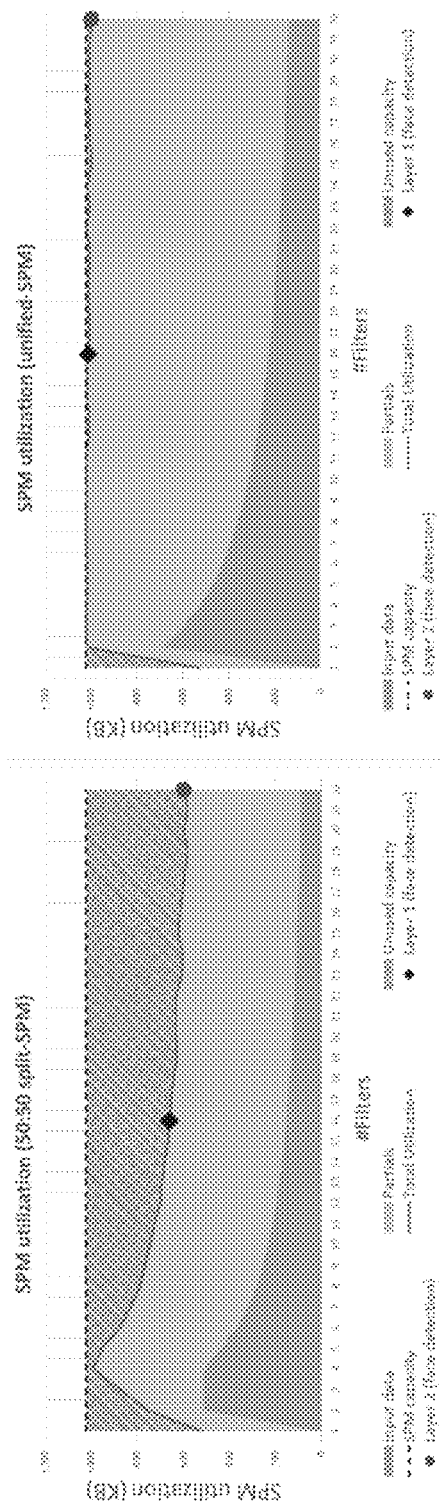
FIGS. 20A-B illustrate different exemplary utilizations for scratchpad memory.

In FIG. 20A, the upper shaded area shows the part of a typical scratchpad memory that is left unused in relation with the number of convolution filters. It is clear that existing designs that have equally sized (i.e., 50:50) dedicated scratchpad memories for input-data and partial results fail to effectively utilize the total available memory area. In fact, as it is shown in FIG. 20A, for the configuration parameters used in convolution layers 1 and 2 of a face-detection CNN, static partitioning utilizes only 65% and 58% respectively of the available scratchpad capacity. On average, a 50:50 split-scratchpad configuration leaves 30% of the scratch pad memory unused.

In contrast, a unified scratchpad 1900, results of which are shown in FIG. 20B, can be dynamically partitioned in an optimal way, thus utilizing practically the entire capacity of the scratchpad memory for any given convolution problem configuration. Note that static scratchpad organizations underutilize the available capacity because the ratio between input-data and partial-results varies significantly depending on the number and size of the filters, and the number and dimensions of the input. This can be easily observed in FIG. 20A by comparing the bottom region (input-data) and middle region (partials) for different number of filters (x-axis).

Figure 21:
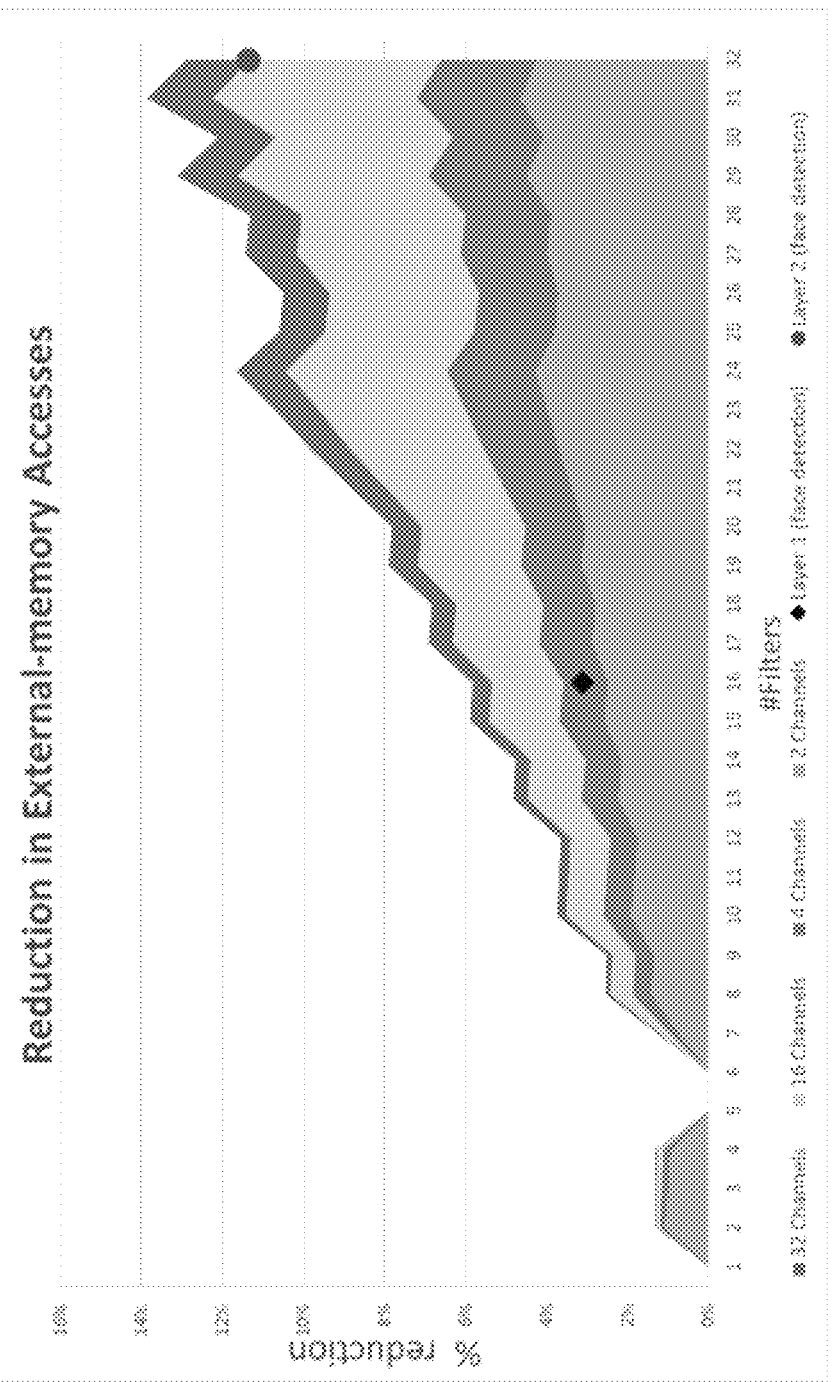
FIG. 21 illustrates a percentage reduction in external memory accesses as a function of a number of filters.

Efficient utilization is important because, as a rule of thumb, higher scratchpad utilization results to fewer accesses to external memory. The reason for this is that typically the available internal memory is not adequate to store the full problem inside the local memory (e.g., 1 channel of a Full-HD image is ~2 MB). Therefore, the input has to be broken in appropriately-sized partitions in order to fit both input-data and partial results in the scratchpad memory. Partitioning, however, results to a part of the input-data to be fetched from external memory more than once. Hence, the more the partitions, the larger the external memory bandwidth overhead. FIG. 21 illustrates the reduction of accesses to external memory achieved using the proposed unified scratchpad design. The benefits for a given total scratchpad memory size may vary depending on the number of channels and filters. For instance, for the example of a face-detection CNN used in FIGS. 20A-B and 21, the reduction of external memory accesses ranges from 3.1% to 11.3% for the configurations of convolution layers 1 and 2 respectively. It is important to note that as we move to higher definition standards, the impact of partitioning becomes even higher. For example, for a 4K UHD input image the reduction in external-memory accesses increases to 5.6% and 17.7% for layers 1 and 2 respectively.

It is clear that the flexibility of a unified design is key to reducing the energy of external memory accesses. In fact, external memory accesses dominate the overall energy cost of CNN computation, accounting for more than 95% of the overall energy for a wide set of CNN configurations. These findings further stress the importance of techniques that reduce redundant external memory accesses.

Most importantly, the embodiments of the invention offer this reduction of external-memory bandwidth without requiring multi-ported memory banks or additional scratchpad array buses that typically require more area and consume more power. Instead, the mechanisms detailed below enable the use of memory banks with only one Read/Write port, similar to the high-density memory blocks used for mid-level caches (MLCs) in general-purpose processor cores. In addition, both read and write requests for multiple memory blocks may be serviced using the same shared array bus, avoiding the prohibitive increase in area of dedicated buses. Still, using a simpler memory array requires handling read/write conflicts in the shared bus and a specialized data mapping to guarantee the required Quality of Service for both input-data and partial results. However, as it is shown below, both issues can be addressed in a straightforward manner and without significant power and area costs.

Figure 22:
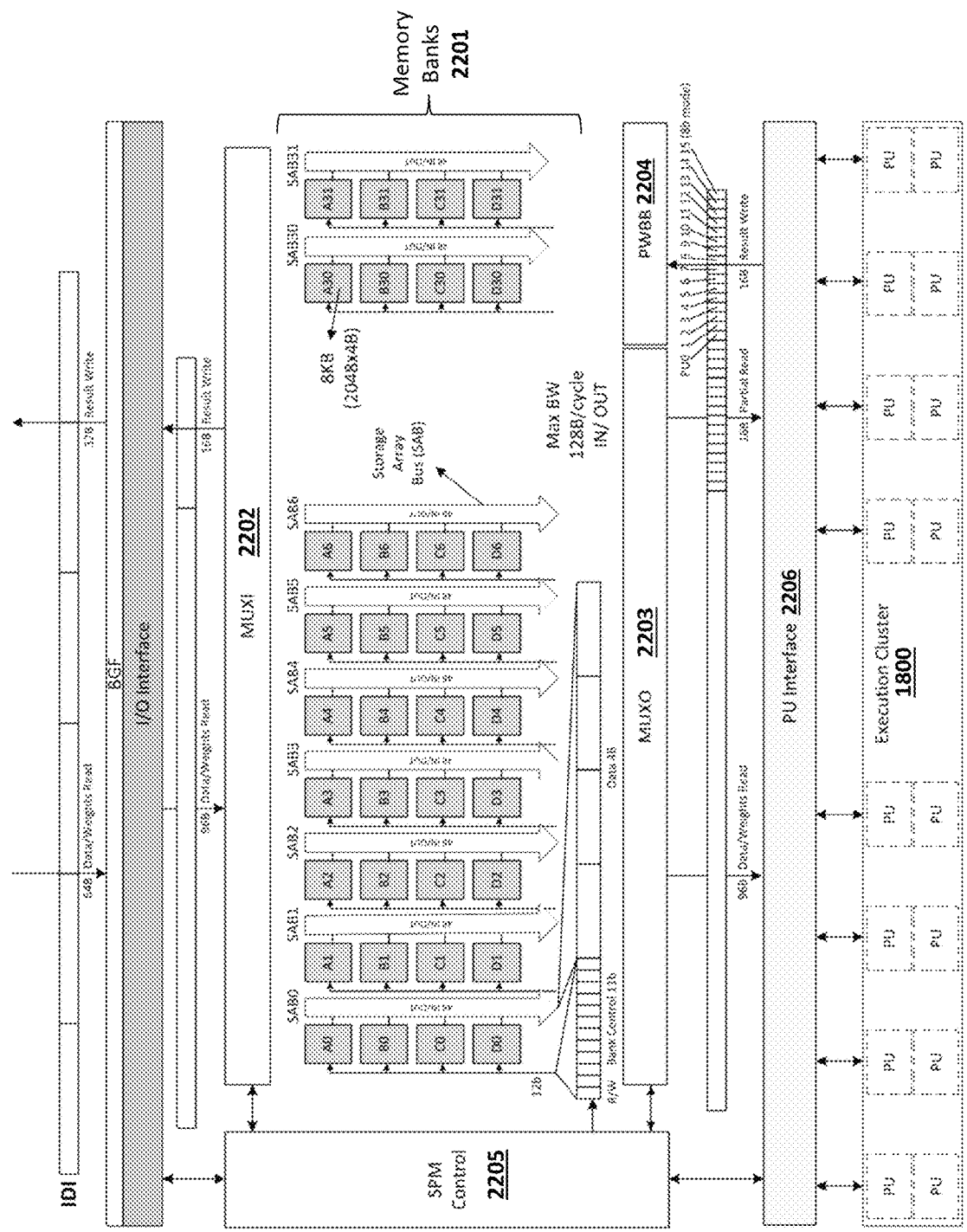
FIG. 22 illustrates a Convolutional Neural Network accelerator in accordance with one embodiment of the invention.

The underlying principles of the invention may be implemented in multiple ways but in one particular embodiment is illustrated in FIG. 22 which has been developed for the Neura™ accelerator, an ultra-low power Convolutional Neural Network accelerator for wearable and mobile devices. In this case 4×32 memory banks 2201 with 1 Read/Write port are used connected through 32 buses SAB0-SAB31. Having 4 banks per bus (A0-D0, A1-D1, etc) allows writes and reads to operate at ¼ of the maximum accelerator frequency. Four additional structures shown in FIG. 22 are input multiplexer (MUXI) 2202, output multiplexer (MUXO) 2203, partial writeback buffer (PWBB) 2204 and a control unit 2205.

In one embodiment, the MUXI 2202 is a set of multiplexers that align the data coming from outside the accelerator and are used to fill the scratchpad memory banks 2201 when the data is accessed for the first time. MUXO 2203 is another set of multiplexers that align the data coming from the internal buses and sent to the processing units (PUs) of the execution cluster 1800 via a PU interface 2206.

In one embodiment, the PWBB 2204 is a set of buffers responsible for keeping the partial results provided by the PUs of the execution cluster 1800 while the destination banks are busy. Since the worst-case pattern is known, these buffers can be dimensioned to store the maximum number of partials that can be generated in a worst-case scenario. PWBB 2204 also handles Partial Writes and requests the control unit 2205 to write to the different buses when they are not used for reading data.

Finally, the control unit 2205 is responsible for controlling the memory 2201. In particular, one embodiment of the control unit 2205 indicates to the multiplexers 2202-2203 which buses SAB0-SAB31 are active every cycle and indicates to the memory banks 2201 when to start read or write operations and on which lines. The main operations that the control unit 2205 handles are Read Data, Write Data, Read Partials, and Bypass Data (e.g., used when data comes from outside the accelerator). It also grants permission to the PWBB 2204 to write partials in the idle buses and banks.

In one embodiment, the data mapping performed for each bank 2201 uses the first N lines for input data (e.g., an input image) and the rest for partials. Partial results can be stored in any homogeneous way, typically in arrival order. The input data is stored such that in every cycle the banks being accessed are changed. Because there are 4 banks per bus in this embodiment (Ax, Bx, Cx, and Dx) the image may be partitioned so that the Ax banks store Even Row and Column elements, the Bx banks store Uneven Row and Even Column elements, the Cx banks store Even Row and Uneven Column elements and the Dx banks store Uneven Row and Column elements.

Figure 23:
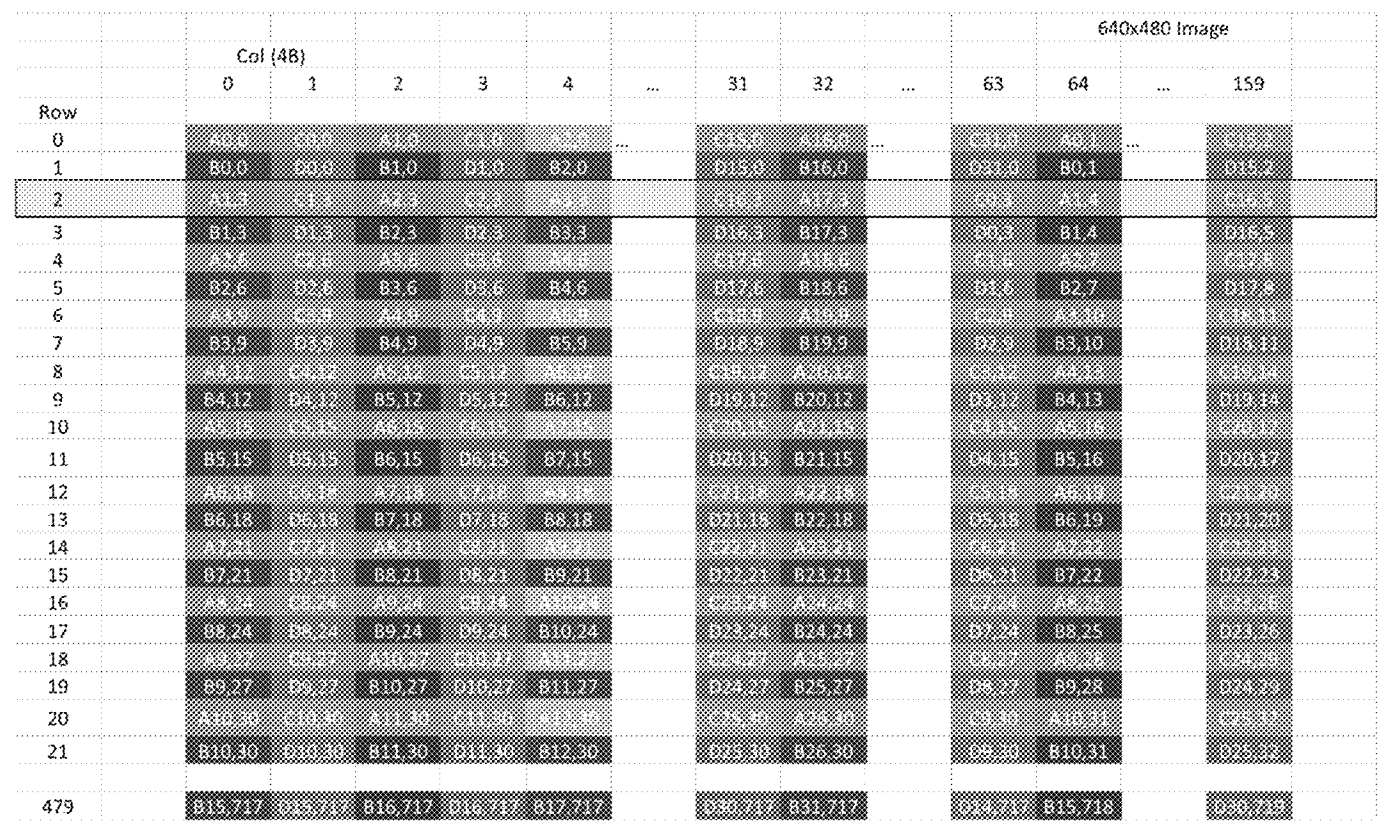
Figure 24:
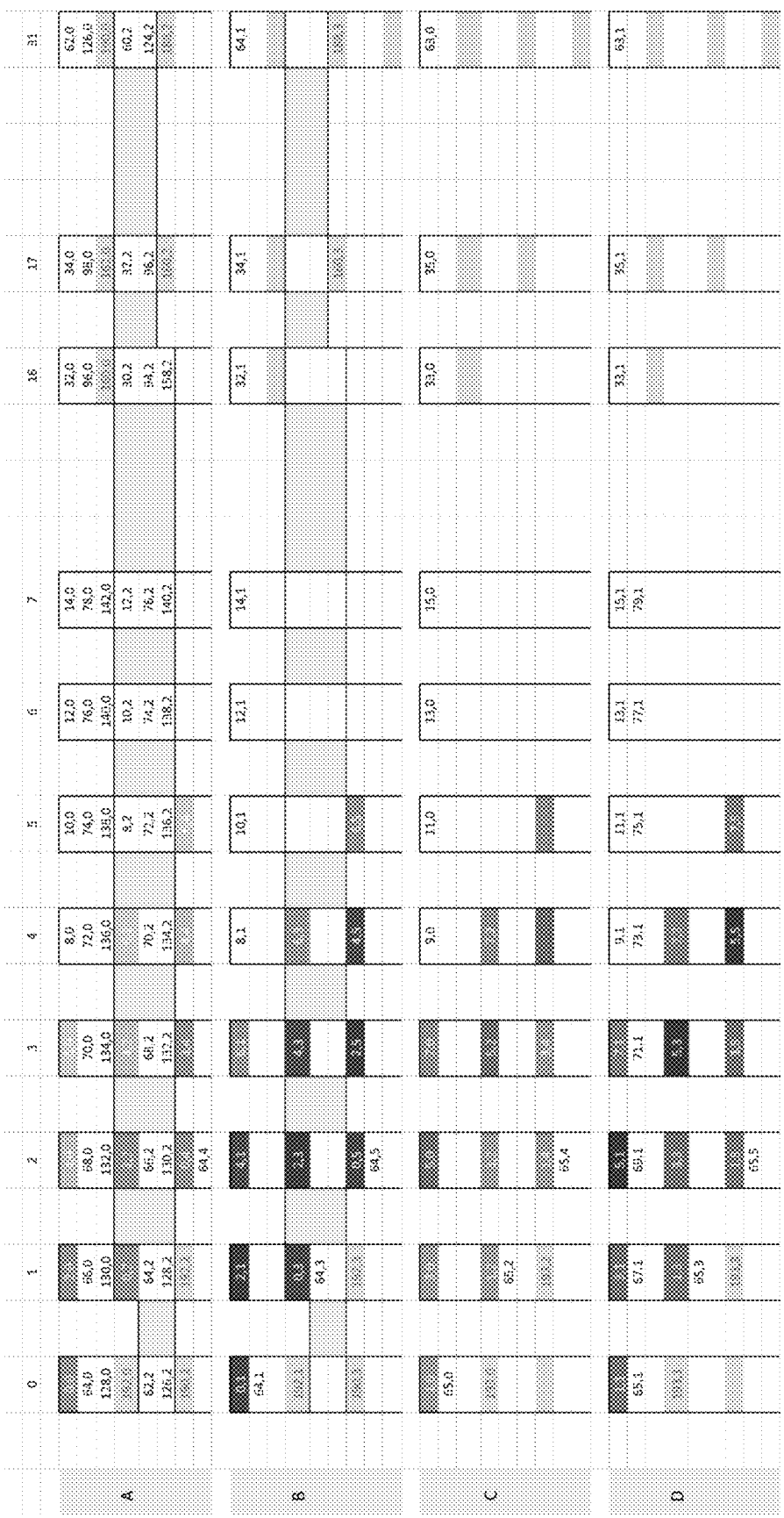
FIG. 24 shows how the elements from FIG. 23 may be mapped in the physical memory banks.

FIG. 23 shows an example of the input data used in the convolver (an image) and FIG. 24 shows how these elements may be mapped in the physical memory banks. The mapping of row 2 (i.e., (2, 0), (2, 2), (2, 4)) can be seen in the figure. Since it is an Even row it is stored in banks A and B as illustrated. It can be seen that the row starts in the second A bank (i.e., (2, 0) is shown in A1) and that the following rows start on different banks to the right.

The number of rows which are accessed changes depending on the problem to be solved (e.g., based on filter size, the number of filters computed simultaneously, etc). Therefore, depending on the problem, simultaneous access is needed to a different number of banks. For example, if the convolution row is composed of 6 image rows, the system will access (A0, A1, A2-B0, B1, B2-C0, C1, C2-D0, D1, D2-A1, A2, A3). The memory organization described herein supports different convolution row sizes which require only one element from each bank. As such, this particular embodiment supports access to all the new data required by the convolution in two memory cycles. The number of cycles required can be selected depending on the problem requirements and power/area restrictions by adding more dedicated buses.

One beneficial aspect of the embodiments described above is that the data does not require individual tags to be identified. Since the access patterns are highly regular, the control unit 2205 is capable of tracking the indexes of the different banks without the need for tag arrays. Not using tags has a significant advantage in terms of area, power and delay and provides for significantly improved energy efficiency than traditional storage structures.

Fine-Grain Storage Interface and Method for Low Power Accelerators

Image processing algorithms are gaining interest due to their multiple applications in novel human-computer interfaces which make possible better user experiences. One of the most important operations in image processing is the convolution. Among other applications, convolutions are widely used for applying filters to images in Image Signal Processors (ISPs), as well for image recognition in Convolutional Neural Networks (CNNs).

Convolution operations multiply together two arrays of numbers, generally of different sizes but same dimensionality, to produce a third output array. In image processing, one of the input arrays is the input image. The second array is known as the kernel, which is normally much smaller than the input image. The convolution operation is performed by sliding the kernel over the image, normally starting from the top-left corner. Each kernel application generates an output pixel calculated by multiplying the values of the kernel with the underlying sub-image values, and adding all the results together. Mathematically, the convolution may be described as:

$$O(x, y) = \sum_{k=1}^{m} \sum_{l=1}^{n} I(x+k-1, y+l-1) K(k, l)$$

where I is the input image, K is the kernel, and O(x,y) represents the pixel in coordinates x, y of the output image. Constants m and n are kernel width and height respectively.

Figure 25:
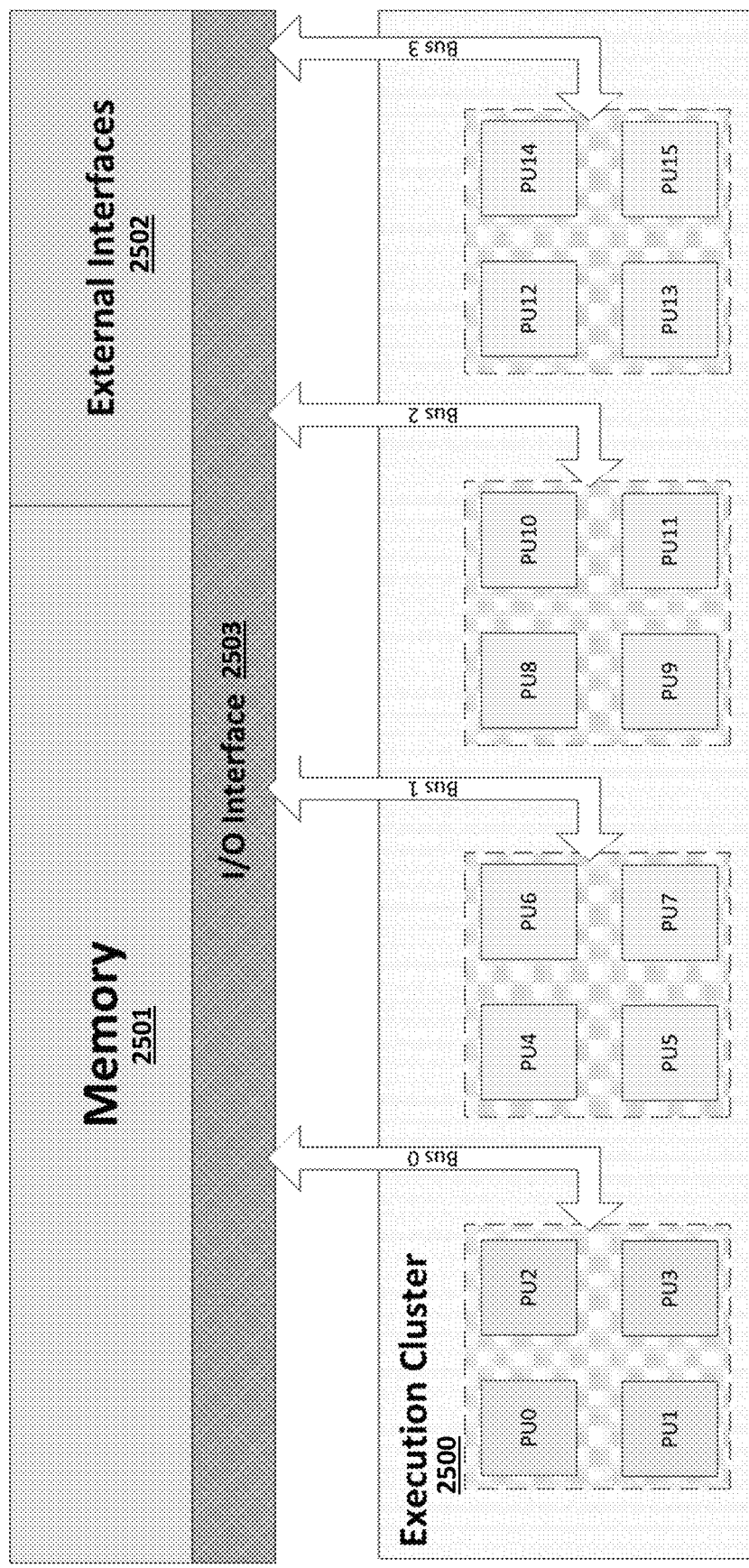
FIG. 25 illustrates a high-level block diagram of a generic accelerator for image processing.

Image processing algorithms have very high computational requirements that may be prohibitive for traditional low-power segments due to their limited power budget and processing capabilities. To overcome this issue, many groups have recently worked on developing specialized architectures known as "accelerators," which offers orders of magnitude better energy efficiency than conventional approaches. These architectures normally have several processing units (PU) to perform very efficiently a large number of multiplications and additions in parallel. FIG. 25 shows a high-level block diagram of a generic accelerator for image processing. The PUs 0-15 form the execution cluster 2500. The outputs from the PUs are collected and processed in a synchronized manner in order to produce the expected results. Data is communicated to the execution cluster 2500 from either the memory 2501 via the I/O interface 2503 or the external world from external interfaces 2502 via the I/O interface 2503 (e.g., using point-to-point buses). PUs are normally grouped in clusters communicated with memory 2501 and external interfaces 2502 through an interconnection network.

However, these architectures require huge memory bandwidth to feed all processing units when performing convolutions, which reduces the overall energy efficiency of the system and requires the implementation of complex memory interconnections—requirements that are prohibitive for low-power System-on-Chip (SOC) designs.

Current designs propose traditional data cache organizations to reduce the bandwidth requirements. In these designs, the cache structure is placed between the I/O Interface 2503 and the execution cluster 2500. However, these solutions do not fully exploit the characteristics of the convolution operation, resulting in non-optimal results. In these approaches, each processing unit, or subset of processing units, requests data individually, which requires a high number of cache read ports. In fact, up to 18 read ports are required for providing enough data when performing a 16×16 stride 1 convolution in an accelerator similar to that presented in FIG. 25. Given that area and energy consumed by the memory banks significantly increases with the number of ports (array area can be doubled, and both dynamic and leakage energy can increase around 36% by just adding one extra port), the number of ports is prohibitive for implementing an accelerator. Moreover, this problem is exacerbated when the number of processing units is increased to perform convolutions faster. Fortunately, the access patterns of convolutions are very predictable and they exhibit high spatial and temporal data locality that can be exploited to reduce the number of memory accesses and the required number of read ports.

The embodiments of the invention include a fine-grain memory interface that allows convolutions to be performed very efficiently in image processors and neural network accelerators with constrained bandwidth, area, and power requirements. The presented embodiment utilizes a novel storage organization and a data shuffler mechanism that work in cooperation to provide image data to the execution cluster, minimizing the number of reads to upper cache levels. The scheme takes advantage of the regular access patterns of the convolution operation, and enables the processing of images either as a succession of pixel columns, pixel rows or a combination of both, which is very convenient to efficiently provide data to the processing units. Moreover, the embodiments of the invention are modular and scalable, covering a large variety of convolution problems, ranging from the application of small filters (2×2 pixels) to large filters (64×64 pixels).

The proposed embodiments enable the integration of image processing and neural network accelerators targeting convolution operations in low-power and bandwidth-constrained devices. The aim of these embodiments is to process the convolution operation very efficiently by providing sufficient image data to feed all processing units while keeping memory traffic within reasonable limits. This is accomplished in one embodiment by processing the image in the most convenient way to perform the convolution operation.

Figure 26:
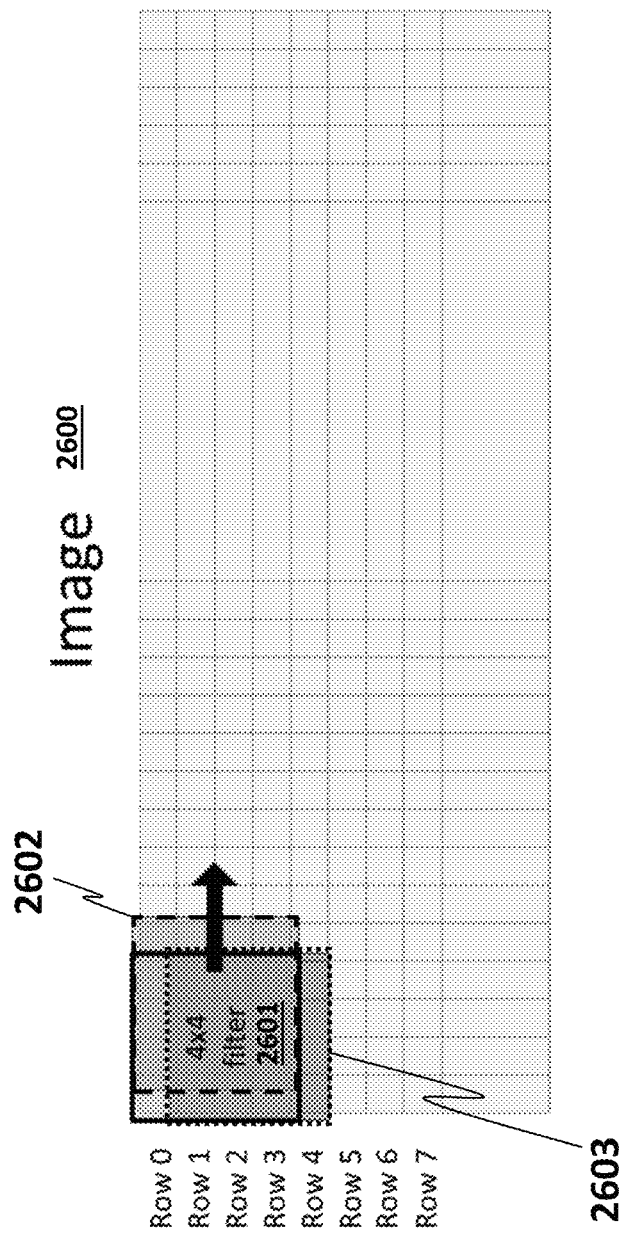
FIG. 26 shows an exemplary image where a kernel of 4×4 pixels is applied from top-left to bottom-right corner with a stride of 1 pixel.

Convolutions have very high spatial and temporal data locality. Consecutive applications of a kernel share a significant amount of input image data. FIG. 26 shows an image 2600 where a kernel of 4×4 pixels 2601 is applied from top-left to bottom-right corner with a stride of 1 pixel. When the convolution operation starts, the kernel is applied over a squared image region of 4×4 pixels 2601. Once the first output pixel is computed, the kernel is shifted to the right as indicated by dotted line region 2602 in the image. This new operation can be performed by just requesting just four extra pixels, representing a column of four rows, because the other pixels have already been provided to the previous kernel operation. Moreover, when the kernel is shifted down as indicated by the alternate dotted line region 2603 in the image, only a single row of four pixels is required because the other pixels have been provided previously.

Traditional approaches store image data as consecutive pixel rows or columns, requiring multiple memory accesses to generate columns when data is stored as rows, or rows when data is stored as columns. These extra accesses significantly increase the number of memory read ports, and hence, the total power consumption of the accelerator and the bandwidth. This is exacerbated when multiple instances of the same kernel are performed simultaneously in the accelerator. The embodiments of the invention internally organize the image to exploit data locality and offer fine-grain access to provide precisely the required pixels for each kernel application, reducing significantly the number of required ports.

Figure 27:
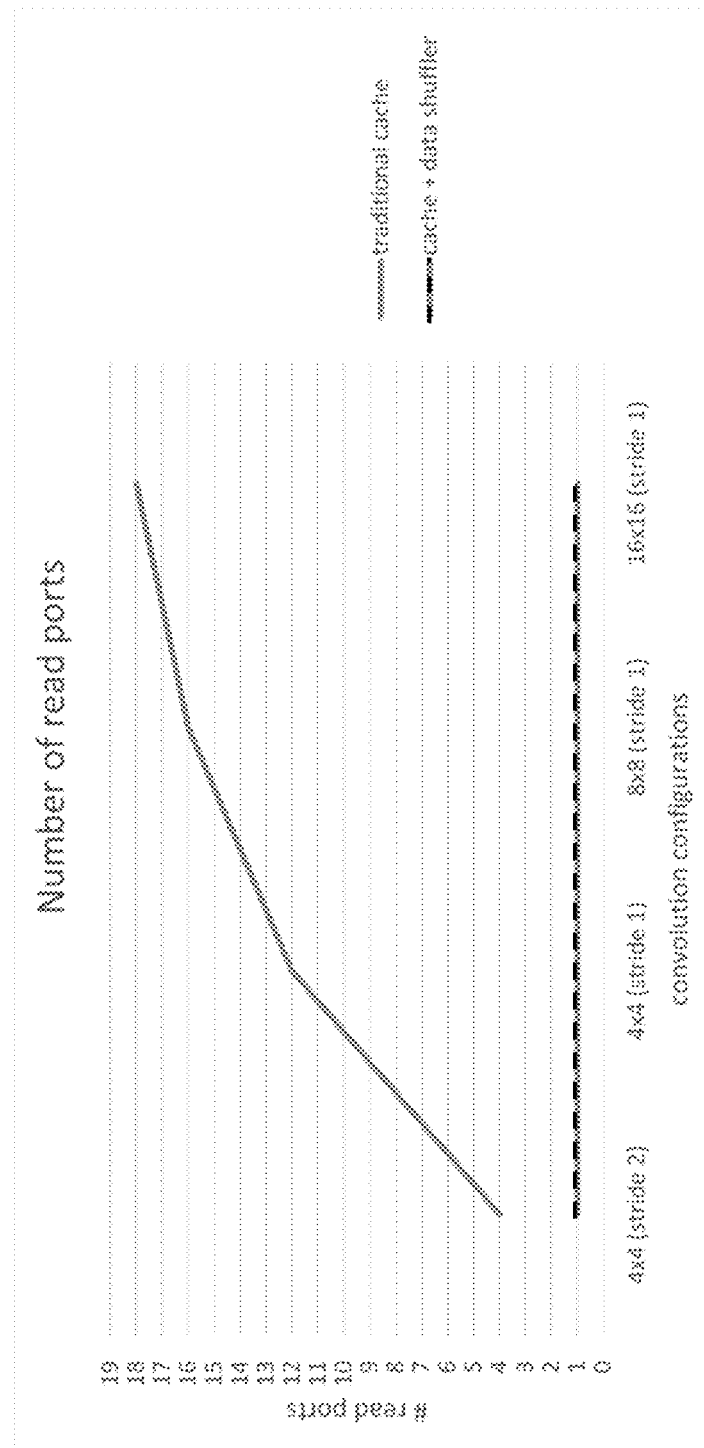
FIG. 27 illustrates a number of read ports as a function of convolution configurations.

FIG. 27 illustrates the number of read ports required to perform different types of convolutions in an accelerator similar to the one presented in FIG. 25. The convolution configurations (kernel size and stride) are shown on the x-axis, while the number of ports are shown on the y-axis. An accelerator implementing a traditional cache structure is compared with and without using the embodiments of the invention (cache+data shuffler versus traditional cache). As it can be observed, the number of read ports required in the traditional design ranges from 4, in the case of a convolution of 4×4 pixels stride 2, to 18 in the case of a convolution of 16×16 pixels stride 1. By contrast, using the embodiments of the invention, the number of read ports is always equal to 1 with no dependence of the convolution configuration. This drastic reduction on the number of cache read ports is achieved by taking advantage of the regular patterns observed in the convolutions and highly exploiting data locality as described in detail below.

As mentioned, the embodiments of the invention enable the performance of convolutions very efficiently in image processors and neural network accelerators with constrained bandwidth, area, and power requirements by significantly reducing the number of memory read ports. These properties are achieved by:

1. Data organization and indexing based on patterns for convolutions. Data is organized in a manner which exploits spatial and temporal locality. Images can be processed traversing pixel rows, pixel columns, or a combination of both. The number of accesses to external memory and/or upper cache levels is lower than in traditional approaches, which significantly reduces the power consumption and the bandwidth of the accelerator.

2. Tag-less storage organization, which keeps the accelerator area within reasonable limits.

3. Distributed data organization that simplifies the connections between the upper cache levels and the processing units.

The aforementioned properties allow the embodiments of the invention described herein to meet physical constraints of current SoC technology.

Figure 28:
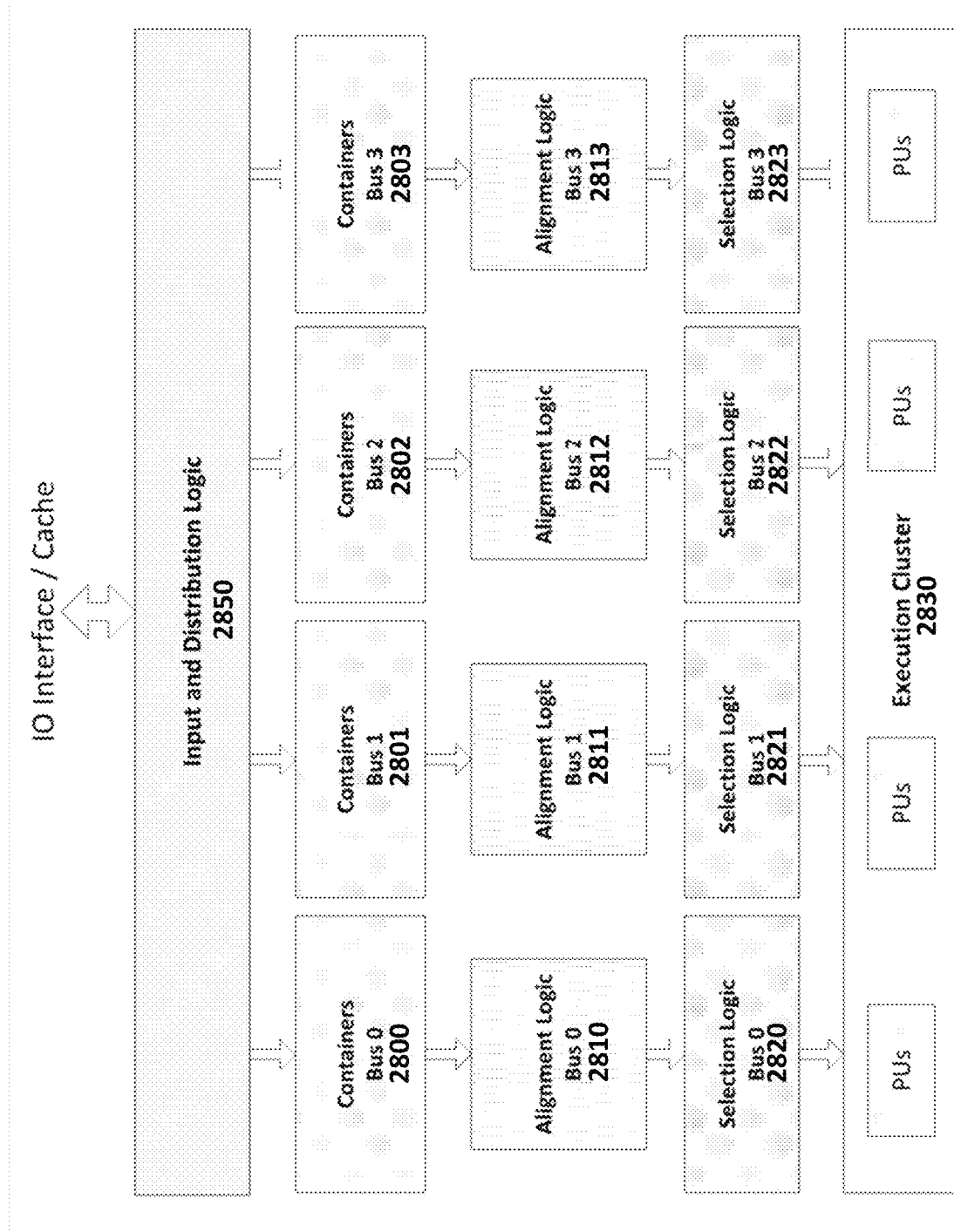
FIG. 28 illustrates one embodiment of an accelerator with 4 clusters.

A high-level block diagram of one embodiment of an accelerator with 4 clusters is shown in FIG. 28. This embodiment of the invention includes four components: (1) input and distribution logic 2850, (2) containers 2800-2803, (3) alignment logic 2810-2813, and (4) selection logic 2820-2823. The containers, the alignment logic, and the selection logic components may be split in groups, each one connected to a different cluster of processing units 2830. By contrast, in one embodiment, the input and distribution logic 2850 is shared by all clusters. The four components are connected sequentially as illustrated. The input and distribution logic 2850 is directly connected to the containers 2800-2803, the containers with the alignment logic 2810-2813, and the alignment logic with the selection logic 2820-2823. in one embodiment, all components work in a synchronized manner, and they cooperate to provide image data for all processing unit clusters 2830 simultaneously.

The Input and Distribution Logic

In one embodiment, the convolution is performed by applying a kernel over the whole original image. The processing units 2830 collaborate to traverse the image, applying the convolution operations to the pixels (multiplications and additions), and grouping the results to generate the final output image. In this process, each cluster of processing units 2830 works with a subset of pixels from the input image. The input logic 2850 gets the image data from upper cache levels, and selectively broadcasts it to the containers 2800-2803 according to the computation requirements of each cluster of processing units. In fact, pixels are internally stored in the containers of each cluster for their later usage. This modular and scalable approach allows the design to cover multiple convolution configurations, ranging from small kernels (2×2 pixels) to very large kernels (64×64 pixels).

The Containers, the Alignment Logic and the Selection Logic

Figure 29:
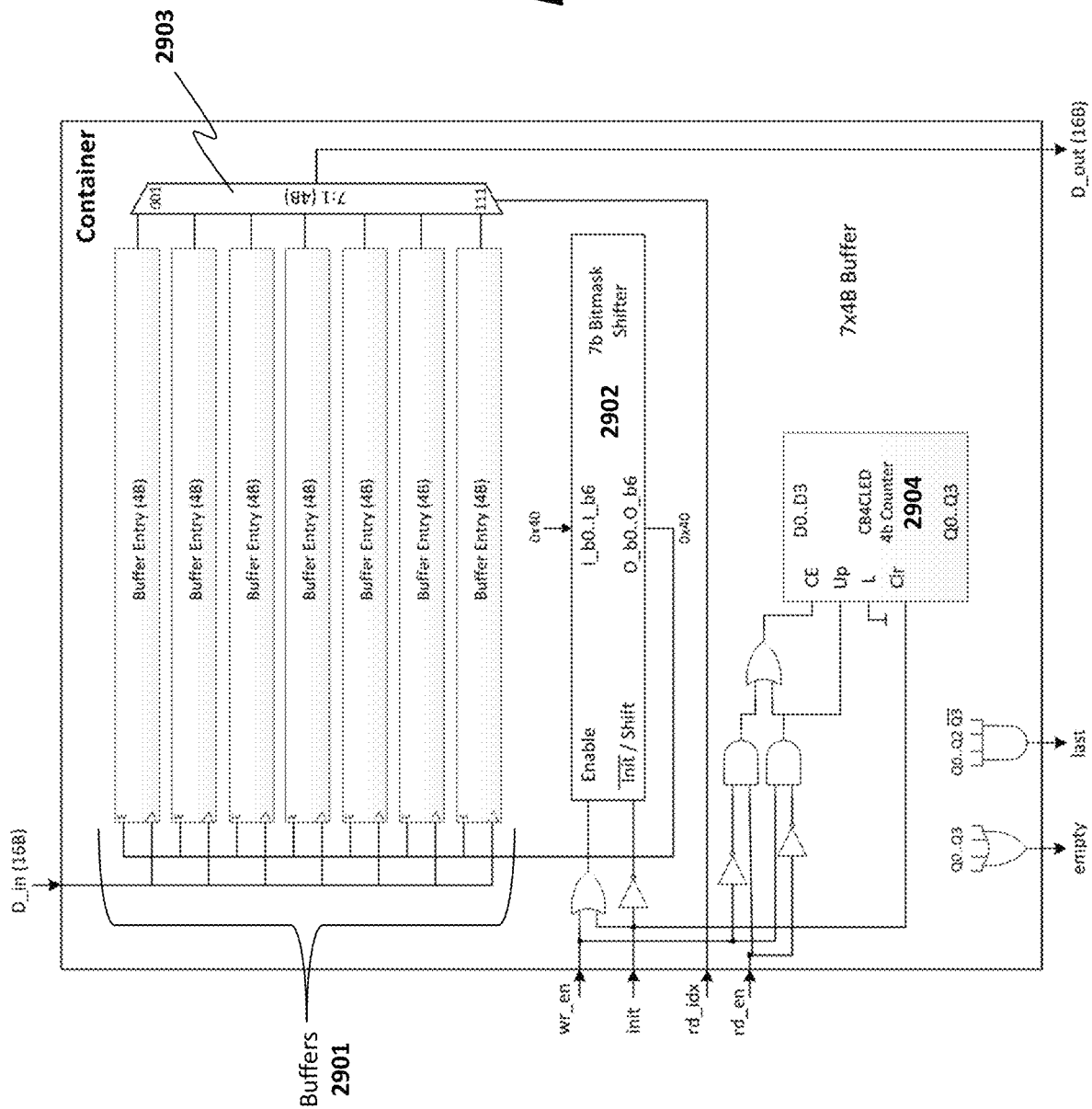
FIG. 29 illustrates a data container in accordance with one embodiment of the invention.

In one embodiment, the accelerator handles two types of information when performing convolutions: input image data (pixels) and kernel weights. Both types of information are stored in the containers 2800-2803, which may be implemented as tag-less storage units that allow reading and writing multiple consecutive pixels in parallel. One embodiment of a container is illustrated in FIG. 29 which includes a set of buffers 2901 of a fixed width and a simple logic to handle the writing and reading of the elements. In particular, the inputs to the buffers 2901 are controlled by a write enable signal (wr_en) applied to a 7b Bitmask Shifter 2902. in one embodiment, the output of a counter 2904 controlled by a read enable signal (rd_en) and the write enable signal (wr_en) is ORed together with the write enable signal as illustrated to control the shifter 2902. In one embodiment, the shifter 2902 shifts through addresses to select each of the buffer entries 2901 in response to a shift signal (Init/Shift). The output of the bitmask shifter 2902 selects a buffer entry into which the input data is written. Although pixels are always written in sequence (like in a FIFO buffer), they can be read randomly. In particular, in one embodiment a multiplexer 2903 selects one of the buffer entries to output (D_out) in response to a read address signal (rd_idx).

Two different types of containers are employed in one embodiment of the invention: row containers for the image data, and weights containers for the kernel weights. In one particular embodiment, there are 48 row containers and 4 weights containers, representing a total of 2048 bytes.

Image pixels are stored in the row containers before sending them to the execution cluster. Actually, each individual row container stores multiple pixels of a single image row. The union of multiple row containers cover a portion of the original input image. The containers make it possible to acquire access to multiple pixels from different rows simultaneously without requiring multiple accesses to the upper cache levels. In one embodiment, the full set of row containers is capable of providing up to 4 consecutive pixels from N different rows, where N is the number of row containers. Data is stored in a natural way for performing convolutions, and pixels can be accessed just by identifying the rows where the operation is going to be applied. Consequently, the containers of one embodiment do not require tags.

In one embodiment, the outputs from the row containers are connected to the alignment logic 2810-2813 which gives access to individual pixels of a row entry. The alignment logic 2810-2813 makes it possible to apply simple data transformations, such as the data transpose required to generate image columns. The table in FIG. 30 shows the particular alignment modes implemented in one embodiment of the invention. The first column identifies the type of alignment, whereas the other columns represent the aligned outputs ($AO_x$) given the content from a generic row container ($O_x$). This logic can easily be extended to support other alignments in different embodiments of the invention.

In one embodiment, the weights are stored in memory in the same format they are expected by the processing units. Therefore, the weight container outputs do not need alignment and are directly connected to the output of the selection logic 2820-2823.

In one embodiment, the selection logic 2820-2823 is in charge of creating the output data in a format ready to be consumed by the processing units. In general, the selection logic 2820-2823 knows what data needs to be taken from which containers, and where it needs be placed for generating the output packet that will feed the processing units. To do so, one embodiment of the selection logic 2820-2823 reads the aligned outputs from one or multiple containers 2800-2803, and places this information into the output packet for the execution cluster 2830. The logic employed in one embodiment of the invention is shown in the table in FIG. 31. The first column refers to the image access mode being considered: row, columns or squares. The four next columns refers to the output packet. Note that, $C_x$ refers to container number X, and $AO_x$ refers to the container aligned output in position X. As it is shown, the output is generated by reading the four aligned outputs of a single container in the 4B row mode. In the 4B column mode, the output is generated by selecting the first aligned position of four different containers. Finally, in the 4B square mode, the output is generated by selecting the first two aligned positions of two different containers (e.g., a 2×2 pixel square region). These modes allows traversing the image data either in pixel rows, pixel columns, or as a combination of both. This provides the convolution patterns to the execution cluster 2830 very conveniently to highly exploit the data locality observed in the convolutions.

Figure 32:
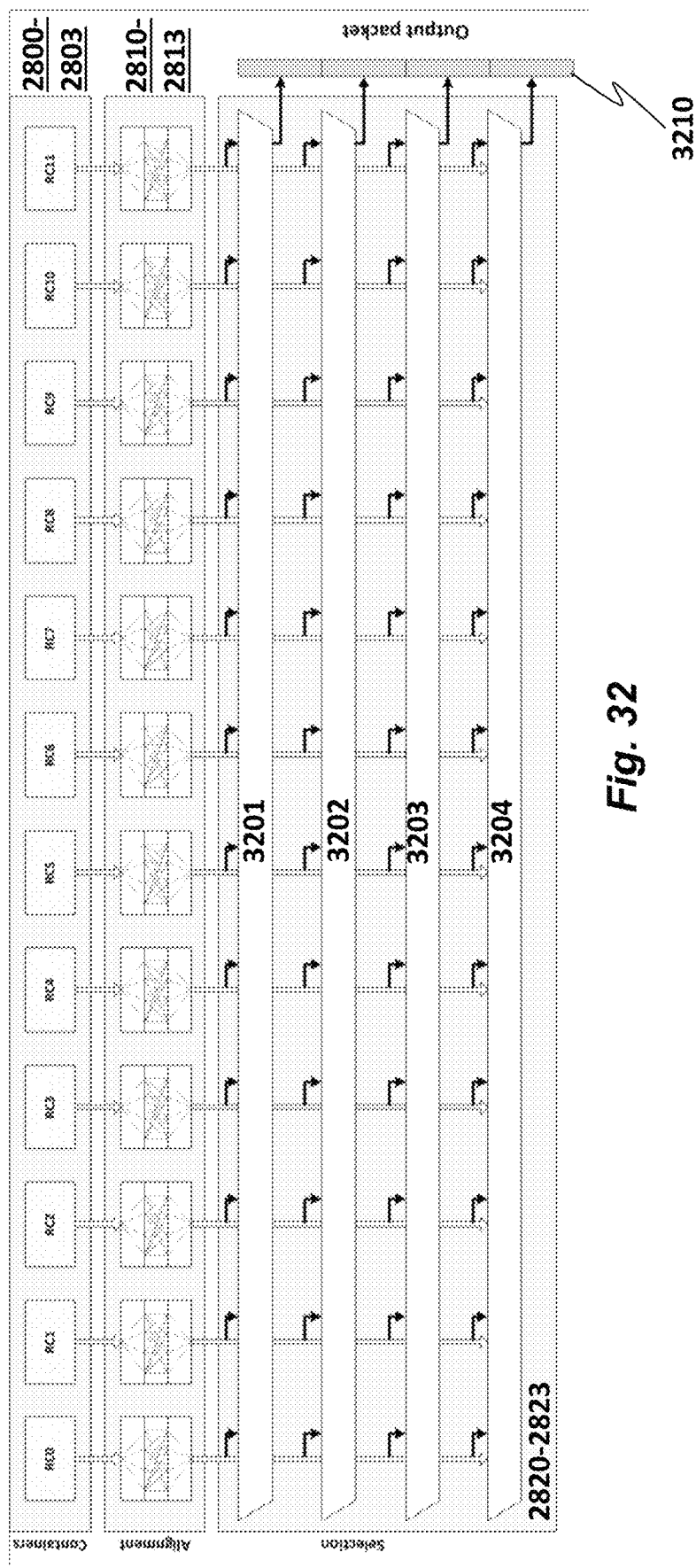
FIG. 32 illustrates how containers, the alignment logic, and the selection logic are interconnected to produce output packets in accordance with one embodiment of the invention.

FIG. 32 illustrates how one embodiment of the containers 2800-2803, the alignment logic 2810-2813 and the selection logic 2820-2923 are interconnected to produce the output packets 3210 for the execution cluster 2830. Each one of a set of multiplexers 3201-3204 selects one a portion of the output packet 3210 from one of the outputs from the alignment logic 2810-2813. Note that the components across the different clusters work in a collaborative manner and produce the output packets 3210 simultaneously. The processing units execute in lockstep after receiving the data from the selection logic 2820-2823.

The containers 2800-2803, the alignment logic 2810 and the selection logic 2820-2823 together make possible providing data to all processing units in the most convenient way for performing convolutions. Although each cluster of processing units 2830 may have different data requirements, this logic provides the data without making multiple accesses to the upper cache levels. Data is stored temporally in the containers 2800-2803, and the alignment logic 2810-2813 and selection logic 2820-2823 provide it in a flexible way to fulfill the requirements of each cluster 2830. For instance, the illustrated embodiments may provide multiple image columns from non-consecutive rows simultaneously, requiring only one memory access in total, whereas in a traditional caching scheme, this operation requires one individual access for each accessed row.

Reconfigurable Functional Unit and Method for Artificial Neural Networks

Figure 33:
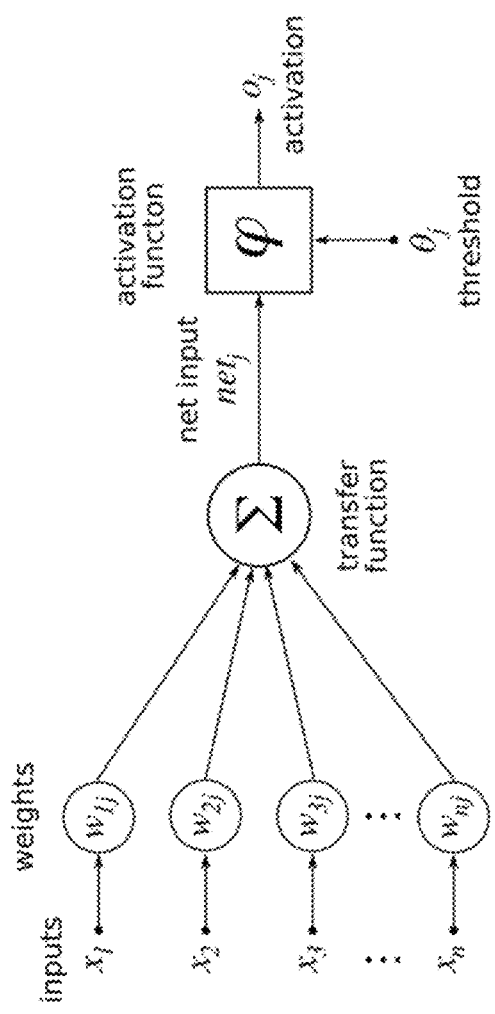
FIG. 33 illustrates an exemplary Activation Function (AF) that calculates the output of a neuron based on its weighted inputs.

As mentioned above, ANNs are configured as a set of interconnected "neuron" layers with neurons connected through "synapses." Synaptic weights (or just weights) refer to the strength or amplitude of a connection between two neurons, which can be represented as a numerical value. Hence, the output of a neuron is computed by the addition of all the input neurons from the previous layer pondered by their synaptic weight. The output of this computation is then passed through an Activation Function (AF) which is a mathematical function that calculates the output of a neuron based on its weighted inputs, as shown in FIG. 33.

In order for a neural network to approximate or predict non-linear behaviors, non-linear activation functions must be used. Several non-linear functions can be implemented, although sigmoid, bounded rectified linear and hyperbolic tangent are the most common ones. One problem in convolutional neural networks (CNNs) is what AFs to choose. Studies show that different AFs may provide different accuracies and also may require larger or shorter training times. Ideally, a flexible hardware design should be able to implement various AFs, each one targeted at a specific problem.

Current solutions offered on general purpose CPUs offer flexibility, but brain-inspired algorithms may have very high computational requirements that may be prohibitive in traditional low-power segments due to a limited power budget and processing capabilities. To overcome this issue, both industry and academia have shown great interest in specialized neuromorphic architectures, which offer orders of magnitude better energy efficiency than conventional approaches.

Nevertheless, current neuromorphic architectures provide non-optimal AF implementations. For example, many existing implementations only support one type of AF, normally the one that provides the best results over a vast set of benchmarks. For example, the chosen AF may be excellent for a face-detection problem, but be sub-optimal for voice recognition. Having multiple AF implementations or an architecture that can be reconfigured to provide multiple AF implementations could solve this issue.

Figure 34B:
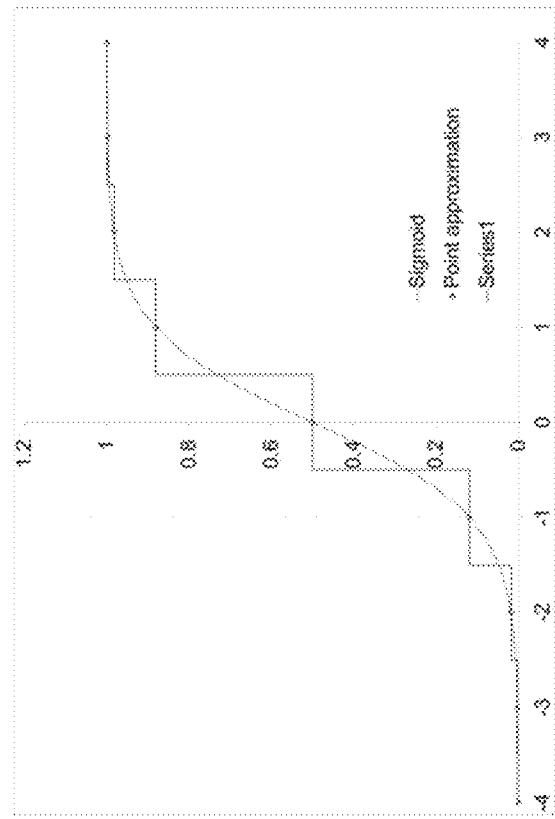
FIGS. 34A-B illustrates the computation of each point in a function approximated by a fixed value using a lookup table (LUT)
Figure 34A:
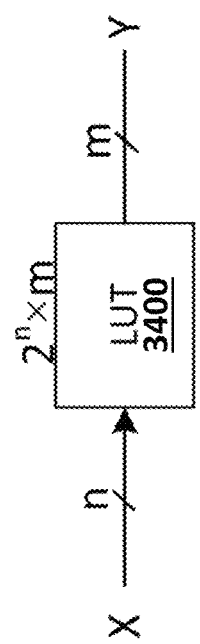
Figure 35B:
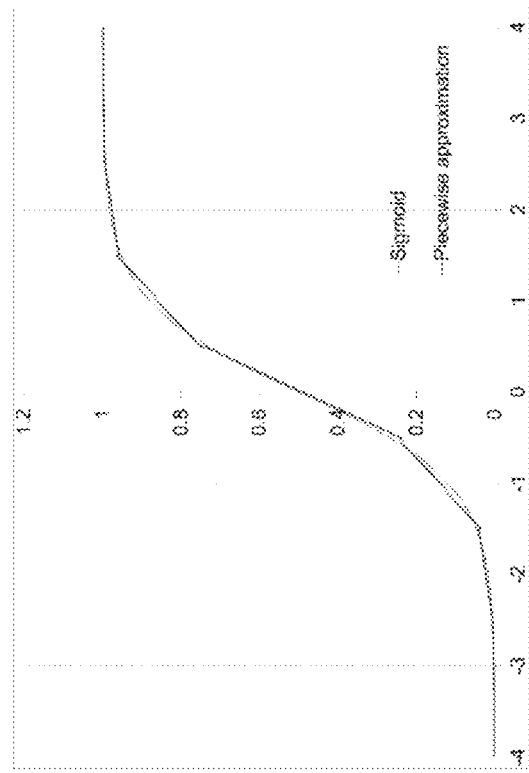
FIGS. 35A-B illustrates that the computation of each point may be approximated by a linear segment with a given slope using an LUT.
Figure 35A:
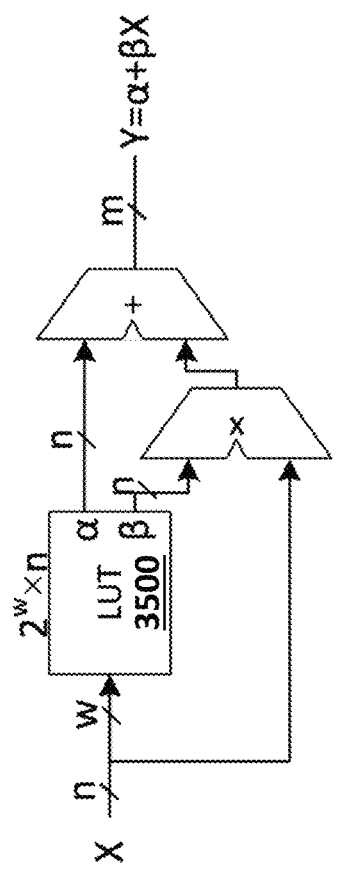

On the other hand, although there are some proposals that try to implement neuromorphic cores with reconfigurable AFs, the methodology they use is not efficient. First, those existing implementations use uniform segmentation, which is not optimal because the size of the segments is limited by the worst case (e.g., the smallest size). Also, the computation of each point in the function is approximated by a fixed value, which can be implemented as shown in FIG. 34A with a simple lookup table (LUT) 3400. FIG. 34B shows an exemplary sigmoid approximation with points. Alternatively, as shown in FIG. 35A, the computation of each point may be approximated by a linear segment with a given slope using a LUT 3500. FIG. 35B illustrates an exemplary sigmoid approximation with a linear function.

Figure 36:
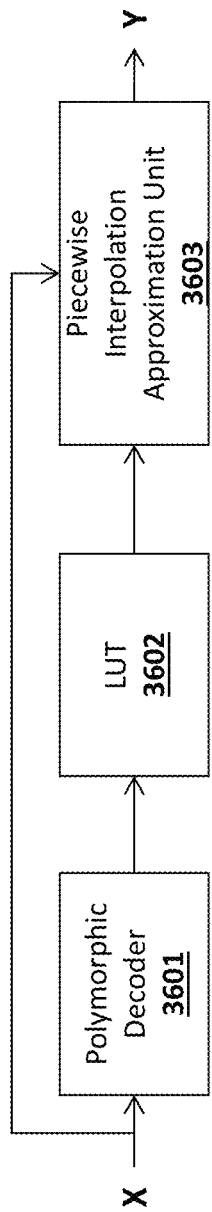
FIG. 36 illustrates one embodiment of the invention including a piecewise interpolation approximation unit optimized for the characteristics of AFs.

One embodiment of the invention includes an optimized and flexible microarchitecture to compute the AF in neural networks. As illustrated in FIG. 36, one embodiment of the architecture is based on a piecewise approximation unit 3603 optimized for the characteristics of AFs. It also includes a polymorphic decoder 3601 that supports non-uniform function segmentation, and an LUT 3602 with the parameters of the different linear segments. As discussed below, it may also include additional logic to perform the computation. Taking into account the characteristics of the AF used in CNNs, the proposed solution minimizes the number of approximation segments for minimum accuracy requirement while also reducing energy. The design can be easily scaled according to the accuracy requirements and allows the system to be extremely efficient in many market segments, ranging from high-performance segments to low-power segments.

ANNs can be executed either in conventional architectures (e.g. high-end processors) or specialized neuromorphic accelerators. Several studies have shown that the latter offers orders of magnitude better energy efficiency than the former. Consequently, they are a better fit for power-constrained segments such as SoC or wearable devices. Nevertheless, AF implementations in current neuromorphic accelerators are not optimal, with significant constraints either in flexibility (e.g., they only support one AF) or, when reconfigurable, they are not efficient for acceptable accuracy levels because they use simple point approximation with uniform quantization (see FIG. 34A), which requires large LUT blocks; or piecewise approximation with uniform quantization (see FIG. 35A), which requires smaller LUT blocks but larger arithmetic units (multiplier and adder).

The embodiments of the invention described herein overcome these limitations and are capable of providing both high accuracy and efficiency with small LUTs and reasonable sized arithmetic units. To illustrate these issues, Table 1 shows the number of LUT entries required in current solutions (A and B) and in the embodiments of the invention for a fixed-point [s2.7] representation and a fixed maximum error of $2^{-7}$. This was determined to be the minimum acceptable error in a face-detection CNN implementation. The three first rows in the table show the number of LUT entries required to support each of the three types of AFs. The last row shows the number of entries required for a reconfigurable solution that supports all three AFs. For a fixed error of $2^{-7}$ C requires only 50% of the entries compared to B and 3.1% of A.

TABLE 1

| AF | A-Uniform (point) | B-Uniform (piecewise) | C-Embodiments of the invention |
|---|---|---|---|
| Hyperbolic Tangent | 512 | 32 | 16 |
| Sigmoid | 256 | 16 | 16 |
| Bounded ReLU | 512 | 4 | 4 |
| All | 512 | 32 | 16 |

Table 2 shows how the error varies when considering the same number of LUT entries (16) for all implementation types (i.e., for cases where area and power consumption impose a restriction).

TABLE 2

| AF | A-Uniform (point) | B-Uniform (piecewise) | C-Proposed solution |
|---|---|---|---|
| Hyperbolic Tangent | $2^{-3}$ | $2^{-6}$ | $2^{-7}$ |
| Sigmoid | $2^{-4}$ | $2^{-7}$ | $2^{-7}$ |
| Bounded ReLu | $2^{-2}$ | $2^{-7}$ | $2^{-7}$ |

Moreover, for the arithmetic computation, the embodiments of the invention only require a shifter instead of the multiplier typically used in piecewise approximation solutions, thus also reducing the power and area requirements.

The embodiments of the invention include a microarchitecture optimized for efficiently approximating the activation functions typically used in ANNs, namely hyperbolic tangent, sigmoid, and bounded ReLU. Nonetheless, the microarchitecture is sufficiently flexible to support other functions as far as they share the common characteristics that are typically found in AFs used in ANNs, i.e., functions that are limited and more sensitive to input changes near the origin. The proposed design is based on the principle of piecewise approximation using linear functions. Moreover, in one embodiment, each linear segment is of the type shown in Equation (1):

$$y(x)=\alpha+\beta x \quad (1)$$

where $\beta=\{-2^t, 0, 2^t\}: t \in N$.

Activation Function Unit Overview

One embodiment of the activation function (AF) unit includes the three main components shown in FIG. 36: (a) a Polymorphic Decoder 3601, (b) an LUT 3602, and (c) a piecewise interpolation approximation unit 3603.

Figure 37:
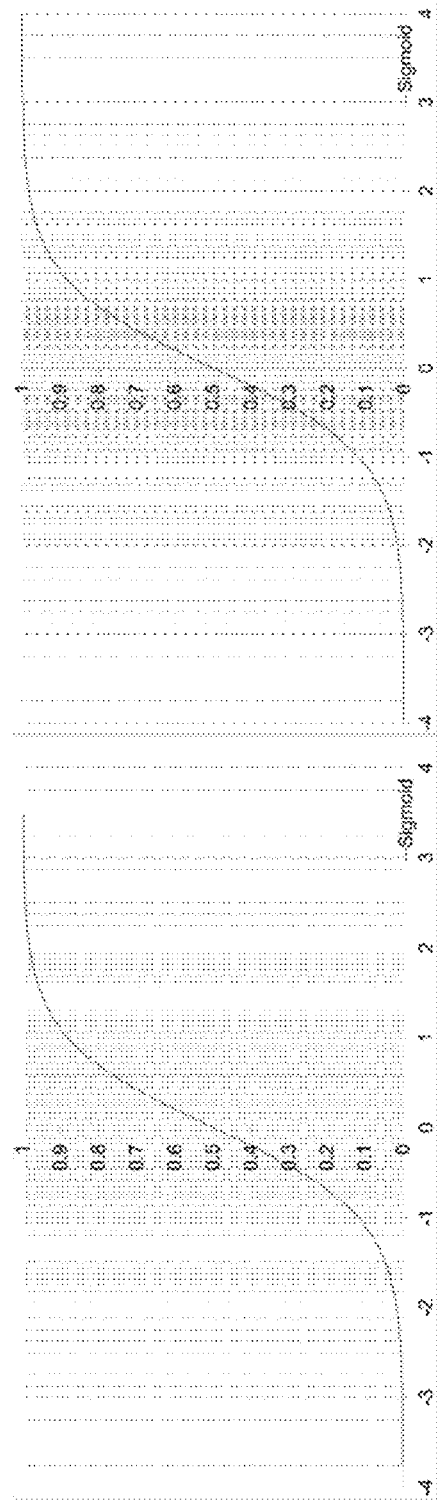
FIGS. 37A-B illustrates a set of data showing how embodiments of the polymorphic decoder maps each input to a range in the abscissa space.

In one embodiment, the Polymorphic Decoder 3601 maps each input X to a range in the abscissa space and leverages the fact that the activation functions considered require more precision (i.e., smaller quantization intervals) near the origin, and less precision for larger |X| (see FIG. 37A). This characteristic is common to the activation functions used to model the non-linearity present in the response of neurons. Therefore, if we consider a fixed initial set of input quantization intervals as the ones shown in FIG. 37A, the Polymorphic Decoder 3601 can be configured to select a smaller non-uniform subset of intervals such as the ones shown in FIG. 37B (indicated by the thick lines). This methodology supports an efficient and flexible transformation between the input X and an index to the piecewise linear segments stored in the LUT 2602 according to the characteristics of the approximated activation function. The intervals selected for a given function are therefore related with its characteristics.

In one embodiment, the LUT unit 3602 is the component where the parameters of the linear interpolation segments are stored. As illustrated, it uses the results of the Polymorphic Decoder 3601 as input. The parameters stored in the LUT 3602 for a given linear segment are used by the piecewise interpolation approximation unit 3603 to compute the final result according to Equation (1) above.

Methodology Overview

Figure 38:
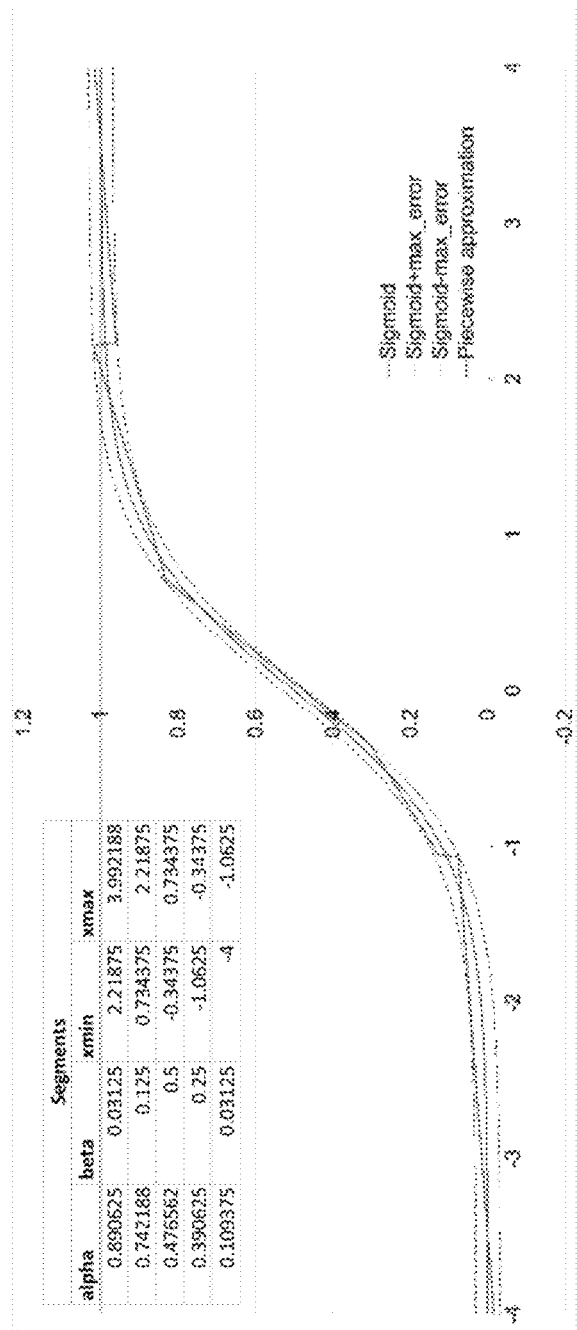
FIG. 38 illustrates an example of a sigmoid function with a maximum error of $2^{-5}$ and 5 linear segments.

The following methodology is implemented in accordance with one embodiment of the invention. First, the activation functions considered are split into linear segments, using any piecewise approximation algorithm that guarantees: (1) a maximum error $\in$; and (2) that all slopes respect the rule $\beta=\{-2^r, 0, 2^r\}$ An example of the sigmoid function with a maximum error of $2^{-5}$ and 5 linear segments is shown in FIG. 38 for illustration purposes. The parameters obtained off-line for the different linear segments are stored into the LUT unit 3602 and the Polymorphic Decoder 3601 is configured according to the respective X ranges. Since the maximum error E can be controlled, and since the number of linear segments required depend on the error itself (see Tables 1 and 2), it is possible to use this method for Approximate Computing solutions where, according to the target error, the number of entries in the LUT 3602 is re-adjusted to save extra power (e.g., using clock gating).

In addition, the AF unit may be incorporated into the processing unit of a neuromorphic accelerator 1230 such as the one illustrated in FIGS. 12A-B. Moreover, in order to leverage the configurable capability of the unit, the following mechanisms may be exposed to software:

(1) A mechanism to load the approximation parameters into the LUTs 3602 according to the target function. This mechanism can be exposed via an instruction such as "Load M(Rx)→AF".
(2) If multiple AFs are supported (for example by using shadow-registers or other type of embodiment that supports replication of the register state) an additional instruction is implemented to switch between different AFs, e.g., "SwitchAF AFID #".

One Exemplary Embodiment

Figure 39:
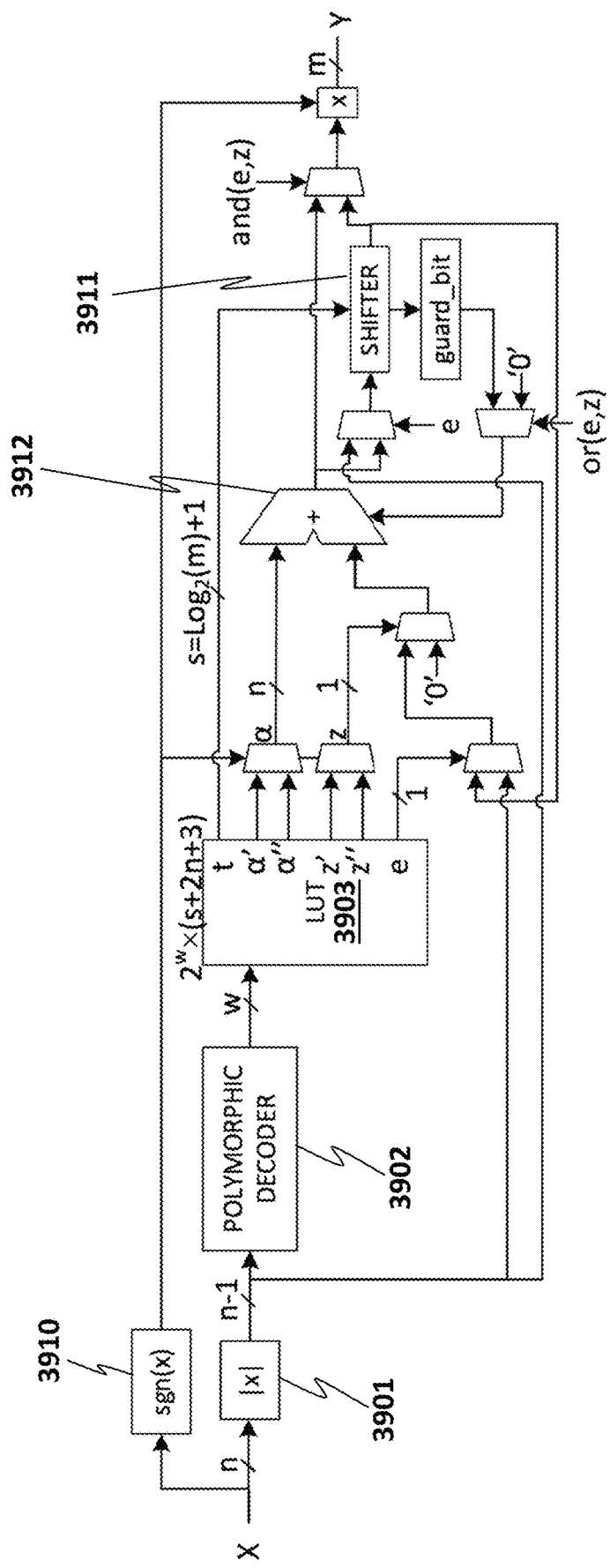
FIG. 39 illustrates one embodiment of an architecture including a LUT and polymorphic decoder.

One exemplary embodiment is illustrated in FIG. 39, which also includes a polymorphic decoder 3902 and an LUT 3903. The modulo X block (|X|) 3901 leverages the fact that the hyperbolic and sigmoid functions have some symmetry to further halve the number of LUT entries. As mentioned above, the LUT 3902 maintains the different parameters necessary for the AF linear segmentation. In this case, there are 6 parameters (t, $\alpha'$, $\alpha''$, z', z'', e).

One embodiment of the piecewise approximation arithmetic unit includes the following components, which perform the specified functions:

(i) Sgn(x) block 3910—the sign of X is used to select the offset parameter ($\alpha$), the zero parameter when $\beta=0$ (z), (see Equation (1) above), and to adjust the final sign of Y. Mathematically we have:

$$y(x) = \text{sgn}(x) \times \begin{cases} \alpha' + z'\beta x, \text{ if } x \geq 0 \\ \alpha'' + z''\beta x, \text{ if } x < 0 \end{cases} \bigwedge \beta = 2^t \bigwedge z', z'' \in \{0, 1\}$$

(ii) Shifter block 3911—the shifter block is used to compute $\beta=2^t$. Some loss of precision can occur when shifting. One embodiment of the invention reduces this loss in two ways: (1) when shifting right, the LSB is stored as a guard bit and used as carry-in in the addition; and (2) depending on '$\alpha$' and 't' the programmer can configure the arithmetic unit to compute Equation (1) in two ways:

$$y(x) = \text{sgn}(x) \times (\alpha + \beta x) \text{ or } y(x) = \text{sgn} \times \left(\beta\left(\frac{\alpha}{\beta} + x\right)\right)$$

The first case where the second case can be used to avoid the right shift before the addition occurs.

(iii) Adder block 3912—finally the adder block is used to perform the addition.

Figure 40:
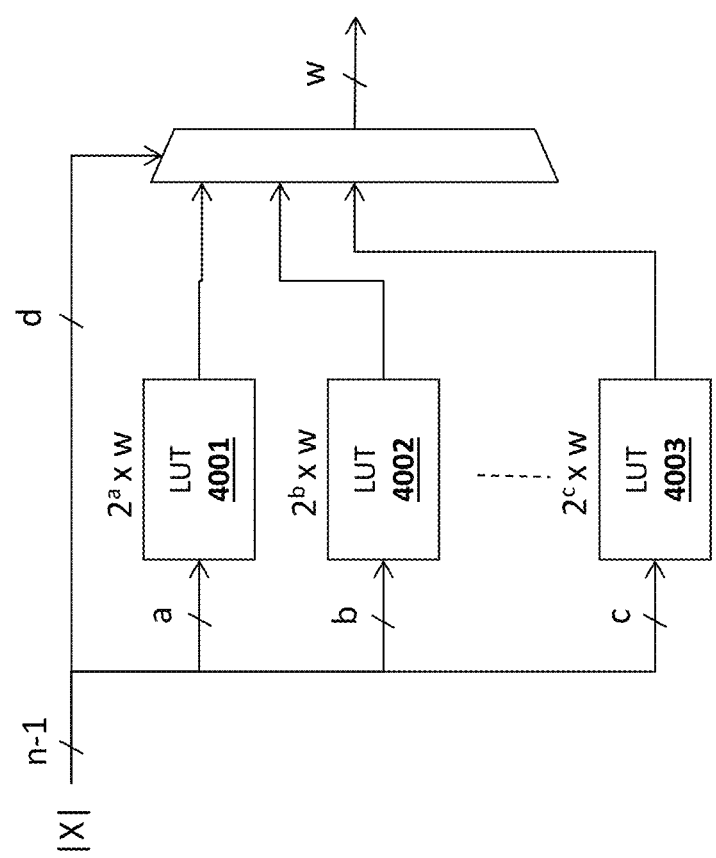
FIG. 40 illustrates one embodiment of the Polymorphic Decoder.

A possible embodiment of the Polymorphic Decoder 3902 is shown in FIG. 40. It consists of a group of small LUTs 4001, 4002, 4003 that provide variable precision intervals to different segments of the function X range as shown in FIG. 37A. The LUT entries can then be configured to map the X intervals to a certain piecewise segment.

An embodiment of an AF unit with input X of fixed-precision [s2.7] and output Y of [s0.7] and support for sigmoid, bounded rectified linear and hyperbolic tangent functions with a maximum error of $2^{-7}$, would require a LUT with 16 entries and a Polymorphic Decoder with 2 LUTs, one with 25×4 bits and a second with 24×4 bits.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions, which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well-known structures and functions were not described in elaborate detail in order to avoid obscuring the subject matter of the present invention. Accordingly, the scope and spirit of the invention should be judged in terms of the claims that follow.

What is claimed is:

1. An apparatus to perform artificial neural network (ANN) processing comprising:
   an input/output (I/O) interface;
   a plurality of processing circuits communicatively coupled to the I/O interface to receive data for input neurons and synaptic weights associated with each of the input neurons, each of the plurality of processing circuits to process at least a portion of the data for the input neurons and the synaptic weights to generate partial results, wherein the plurality of processing circuits includes at least four processing circuits;
   an interconnect communicatively coupling the plurality of processing circuits, each of the processing circuits to share the partial results with one or more other of the plurality of processing circuits over the interconnect, the one or more other of the processing circuits to use the partial results to generate additional partial results or final results; and
   a plurality of latches to store the received data for the input neurons and the synaptic weights associated with each of the input neurons, wherein the received data for a given computation is to be broadcast to all other of the plurality of processing circuits by providing the latched received data to said all other of the plurality of processing circuits over a plurality of processing cycles to avoid reading the received data from the I/O interface multiple times during the given computation.

2. The apparatus of claim 1, further comprising:
   a shared input bus to deliver the data for the input neurons and the synaptic weights to each of the processing circuits; and
   a shared output bus to deliver the partial results or the final results to an external component.

3. The apparatus of claim 2, wherein the processing circuits are to share data including the data for the input neurons and the synaptic weights over the shared input bus.

4. The apparatus of claim 1, further comprising:
   a global control circuit to drive the data for the input neurons and the synaptic weights associated with each of the input neurons from the I/O interface to each of the processing circuits, and to configure each processing circuit to execute its respective portion of the data to generate the partial results.

5. The apparatus of claim 1, wherein the I/O interface is to operate at a first frequency and the processing circuits are to operate at a second frequency which is lower than the first frequency.

6. The apparatus as in claim 1, wherein each processing circuit comprises a plurality of multipliers and adders to perform dot product operations.

7. The apparatus as in claim 1, wherein for the plurality of processing cycles, the data for the input neurons is to be provided to each of the processing circuits on each processing cycle and the synaptic weights are to be provided to a different one of the plurality of processing circuits on each of the plurality of processing cycles.

8. The apparatus as in claim 1, wherein for the plurality of processing cycles, the data for the input neurons and the synaptic weights are to be provided to a different processing circuit on each processing cycle.

9. A method comprising:
   receiving data for input neurons and synaptic weights associated with each of the input neurons provided from an input/output (I/O) interface to a plurality of processing circuits, wherein the plurality of processing circuits includes at least four processing circuits;
   processing at least a portion of the data for the input neurons and the synaptic weights by the processing circuits to generate partial results;
   sharing the partial results of each of the processing circuits with one or more other of the processing circuits over an interconnect communicatively coupling the plurality of processing circuits, the one or more other of the processing circuits using the partial results to generate additional partial results or final results; and
   storing, using a plurality of latches, the received data for the input neurons and the weights associated with each of the input neurons, wherein the received data for a given computation is broadcast to all other of the plurality of processing circuits by providing the latched received data to said all other of the plurality of processing circuits over a plurality of processing cycles to avoid reading the received data from the I/O interface multiple times during the given computation.

10. The method as in claim 9, further comprising:
    delivering the data for the input neurons and the synaptic weights to each of the processing circuits over a shared input bus; and
    delivering the partial results or the final results to an external component over a shared output bus.

11. The method as in claim 10, further comprising sharing data including the data for the input neurons and the synaptic weights over the shared input bus.

12. The method as in claim 9, further comprising:
    driving the data for the input neurons and the synaptic weights associated with each of the input neurons from the I/O interface to each of the processing circuits and configuring each processing circuit to execute its respective portion of the data to generate the partial results.

13. The method as in claim 9, wherein the I/O interface operates at a first frequency and the processing circuits operate at a second frequency which is lower than the first frequency.

14. The method as in claim 9, wherein each processing circuit comprises a plurality of multipliers and adders to perform dot product operations.

15. The method as in claim 9, wherein for the plurality of processing cycles, the data for the input neurons is provided to each of the processing circuits on each processing cycle and the synaptic weights are provided to a different processing circuit on each processing cycle.

16. A system comprising:
- a memory to store instructions and data;
- a plurality of cores to execute the instructions and process the data;
- a graphics processor to perform graphics operations in response to certain instructions;
- a network interface to receive and transmit data over a network;
- an interface to receive user input from a mouse or cursor control device; and
- a neuromorphic accelerator comprising:
    - an input/output (I/O) interface;
    - a plurality of processing circuits communicatively coupled to the I/O interface to receive data for input neurons and synaptic weights associated with each of the input neurons, each of the plurality of processing circuits to process at least a portion of the data for the input neurons and the synaptic weights to generate partial results, wherein the plurality of processing circuits includes at least four processing circuits;
    - an interconnect communicatively coupling the plurality of processing circuits, each of the processing circuits to share the partial results with one or more other of the processing circuits over the interconnect, the one or more other of the processing circuits to use the partial results to generate additional partial results or final results; and
    - a plurality of latches to store the received data for the input neurons and the synaptic weights associated with each of the input neurons, wherein the received data for the input neurons for a given computation is to be broadcast to all other of the plurality of processing circuits by providing the latched received data for the input neurons to said all other of the plurality of processing circuits over a plurality of processing cycles to avoid reading the received data for the input neurons from the I/O interface multiple times during the given computation.

17. The system as in claim 16, wherein the neuromorphic accelerator further comprises:
- a shared input bus to deliver the data for the input neurons and synaptic weights to each of the processing circuits; and
- a shared output bus to deliver the partial or final results to an external component.

18. The system as in claim 17, wherein the processing circuits are to share data including the data for input neurons and the synaptic weights over the shared input bus.

* * * * *